(12) United States Patent
Hayashi

(10) Patent No.: US 7,434,648 B2
(45) Date of Patent: Oct. 14, 2008

(54) PEDAL ASSEMBLY SUPPORT STRUCTURE FOR VEHICLE

(75) Inventor: Kouji Hayashi, Hiroshima (JP)

(73) Assignee: Mazda Motor Corporation (JP)

( * ) Notice: Subject to any disclaimer, the term of this patent is extended or adjusted under 35 U.S.C. 154(b) by 325 days.

(21) Appl. No.: 11/211,468

(22) Filed: Aug. 26, 2005

(65) Prior Publication Data
US 2006/0070487 A1 Apr. 6, 2006

(30) Foreign Application Priority Data
Sep. 27, 2004 (JP) ............................. 2004-279195
Dec. 17, 2004 (JP) ............................. 2004-366228
Dec. 21, 2004 (JP) ............................. 2004-369335

(51) Int. Cl.
*B60K 28/10* (2006.01)
*G05G 1/30* (2008.04)

(52) U.S. Cl. ......................... 180/274; 74/560; 74/512

(58) Field of Classification Search ............... 180/274; 74/512, 560
See application file for complete search history.

(56) References Cited

U.S. PATENT DOCUMENTS

| | | | | |
|---|---|---|---|---|
| 5,848,558 | A * | 12/1998 | Isono et al. | 74/512 |
| 6,006,626 | A * | 12/1999 | Notake et al. | 74/512 |
| 6,041,674 | A * | 3/2000 | Kato | 74/512 |
| 6,209,416 | B1 * | 4/2001 | Tiemann et al. | 74/512 |
| 6,339,971 | B1 * | 1/2002 | Kato | 74/512 |
| 6,499,376 | B2 * | 12/2002 | Thistleton et al. | 74/512 |
| 6,539,823 | B1 * | 4/2003 | Tomono et al. | 74/512 |
| 6,752,038 | B2 * | 6/2004 | Cordero | 74/512 |
| 7,111,703 | B2 * | 9/2006 | Endo et al. | 180/274 |
| 7,191,681 | B2 * | 3/2007 | Sato | 74/512 |
| 7,201,082 | B2 * | 4/2007 | Yamada et al. | 74/512 |
| 7,228,759 | B2 * | 6/2007 | Jagger et al. | 74/512 |
| 2002/0043125 | A1 * | 4/2002 | Oono et al. | 74/512 |
| 2002/0174739 | A1 * | 11/2002 | Cordero | 74/560 |
| 2003/0000334 | A1 * | 1/2003 | Amano et al. | 74/512 |
| 2003/0029267 | A1 * | 2/2003 | Aoki et al. | 74/560 |
| 2004/0020324 | A1 * | 2/2004 | Jemmeson et al. | 74/512 |
| 2004/0055409 | A1 * | 3/2004 | Yamada et al. | 74/512 |
| 2005/0044982 | A1 * | 3/2005 | Hayashi | 74/560 |

(Continued)

FOREIGN PATENT DOCUMENTS

EP  1 512 586 A1  3/2005

(Continued)

*Primary Examiner*—Kevin Hurley
*Assistant Examiner*—Timothy Wilhelm
(74) *Attorney, Agent, or Firm*—Studebaker & Brackett PC; Donald R. Studebaker

(57) ABSTRACT

A vehicle pedal assembly support structure comprises: a bracket to which a pivot shaft for a pedal lever is mounted; a guide member fixed to a vehicle body member other than a dash panel; a fixing mechanism for normally fixing a rear end portion of the bracket to a front end portion of the guide member but disengaging the bracket from the guide member in a vehicle collision; and a relative shift restricting member for restraining the rear end portion of the bracket from relatively shifting in directions other than the rearward direction of the vehicle to the front end portion of the guide member. The guide member is provided with a guide surface for downwardly guiding the bracket moving backward in the vehicle collision to change the posture of the bracket.

16 Claims, 18 Drawing Sheets

U.S. PATENT DOCUMENTS

| | | | |
|---|---|---|---|
| 2005/0109149 A1* | 5/2005 | Sato | 74/512 |
| 2005/0140175 A1* | 6/2005 | Hayashi | 296/187.05 |
| 2006/0102412 A1* | 5/2006 | Morishita et al. | 180/274 |

FOREIGN PATENT DOCUMENTS

| | | |
|---|---|---|
| EP | 1 547 886 A2 | 6/2005 |
| EP | 1 557 330 A2 | 7/2005 |
| EP | 1 566 325 A2 | 8/2005 |
| JP | 09-25821 | 9/1997 |
| JP | 9-254821 | 9/1997 |
| JP | 3267145 | 1/2002 |

* cited by examiner

PEDAL ASSEMBLY SUPPORT STRUCTURE FOR VEHICLE

CROSS-REFERENCES TO RELATED APPLICATIONS

This application claims priority under 35 USC 119 to Japanese Patent Application No. 2004-279195, filed on Sep. 27, 2004, Japanese Patent Application No. 2004-366228, filed on Dec. 17, 2004, and Japanese Patent Application No. 2004-369335, filed on Dec. 21, 2004, the entire contents of all of which are incorporated herein by reference.

BACKGROUND OF THE INVENTION (a) Field of the Invention

This invention relates to a support structure for a pedal assembly for use with a vehicle.

(b) Description of the Related Art

In car collisions, as is often the case, a car cannot be fully stopped even though the driver brakes the car by stepping on a brake pedal for the purpose of avoidance of a collision, resulting in the collision, namely, the car leads to the collision with the brake pedal trod.

In such a case, a front car body goes to collapse while absorbing energy of the collision, and an engine placed in an engine room goes backward while pushing a master cylinder of a brake system located to the rear of the engine. During the time, since a brake pedal lever located to the rear of a dash panel is connected to the maser cylinder through an operating rod, the brake pedal is also pushed backward through the operating rod with the backward movement of the master cylinder.

As a result, a load of car collision acts on the driver's foot with which the driver has stepped on the brake pedal until immediately before the collision to produce a large kick back, thereby applying an impact to the driver's leg.

To cope with this problem, various countermeasures have been conventionally proposed. For example, Japanese Patent Publication No.3267145 discloses a pedal assembly support structure comprising: a pedal bracket fixed at its front end to a dash panel and supporting at its rear portion the pivot shaft of a brake pedal lever; and a guide member fixed to an instrument panel reinforcement rearward of the pedal bracket and supporting at its front end the rear end of the pedal bracket to allow the pedal bracket to disengage from the guide member in a vehicle collision.

In this support structure, the guide member has a guide surface that allows the pedal bracket moving backward in a vehicle collision to abut thereon and then guides the pedal bracket downward. Through the downward guiding of the pedal bracket in this manner, the support structure can angularly move the brake pedal lever to move the pedal at the lower end of the brake pedal lever forward.

For example, in offset collisions, the direction of load of collision input from the dash panel to the pedal bracket may be inclined with respect to the front-to-rear direction of the vehicle. In such a case, with the pedal assembly support structure disclosed in the above document, a flexion may occur in the part of the guide member at which the pedal bracket is mounted. This may prevent reliable implementation of a desired capability to angularly move the pedal lever by moving backward the pedal bracket dropped out of the guide member while guiding it downward along the guide surface.

SUMMARY OF THE INVENTION

The present invention has been made in view of the above and therefore its object is to surely obtain a desired capability to angularly move the pedal lever by reliably guiding along the guide surface the pedal bracket moving backward in a vehicle collision.

The present invention is directed to a vehicle pedal assembly support structure for supporting a pedal assembly which includes a pedal lever placed rearward of a dash panel of a vehicle, a pivot shaft provided at the upper end of the pedal lever to extend in the width direction of the vehicle and a pedal provided at the lower end of the pedal lever, the pedal lever being capable of angular movement about the axis of the pivot shaft.

The vehicle pedal assembly support structure comprises: a bracket which is fixed at the front end thereof to the dash panel and extends rearward from the dash panel and to which the pivot shaft for the pedal lever is mounted at a position toward the rear end of the bracket; a guide member placed at the rear of the bracket and fixed at the rear end thereof to a vehicle body member other than the dash panel; a fixing mechanism formed across a rear end portion of the bracket and a front end portion of the guide member to normally fix the rear end portion of the bracket to the front end portion of the guide member but disengage the bracket from the guide member in a vehicle collision; and a relative shift restricting member for restraining the rear end portion of the bracket from relatively shifting in directions other than the rearward direction of the vehicle to the front end portion of the guide member, wherein the guide member has a guide surface that downwardly guides the bracket moving backward in the vehicle collision to change the posture of the bracket and thereby relatively move the pedal forward.

With this structure, the bracket fixed at its front end to the dash panel is supported at its rear end portion to the vehicle body member through the guide member and the pedal lever is supported at a position toward the rear end of the bracket to the pivot shaft extending in the vehicle width direction for angular movement about the axis of the pivot shaft.

When the dash panel is pushed by the engine in a vehicle collision and thereby moves toward the rear of the vehicle, the bracket fixed to the dash panel also moves toward the rear of the vehicle. In the course of this backward movement, the bracket disengages from the guide member and is then guided downward by the guide surface formed on the guide member. Thus, the top end of the pedal lever supported to the bracket moves rearward and downward, with accompanying forward and downward movement of (the pedal at) the bottom end of the pedal lever.

Further, the support structure includes the relative shift restricting member. Therefore, even if the direction of collision load input from the dash panel to the bracket in a vehicle collision is inclined to the vehicle front-to-rear direction, the rear end portion of the bracket is restrained from shifting in directions other than the vehicle rearward direction relative to the front end portion of the guide member, so that the bracket moves only in the vehicle rearward direction relative to the guide member. As a result, the bracket dropped out of the guide member moves backward while being guided downward by the guide surface, which ensures the desired capability to angularly move the pedal lever.

In the pedal assembly support structure, the fixing mechanism may be a slidable mechanism for disengaging the bracket from the guide member after the rear end portion of the bracket moves a predetermined distance backward in a vehicle collision, and the guide surface may be placed rearward of the fixing mechanism to guide the bracket downward after the bracket moves the predetermined distance backward.

In other words, the pedal assembly support structure may be configured so that the bracket (or the pivot shaft for the pedal lever supported to the bracket) normally does not abut on the guide surface but abuts on it after the backward movement in a vehicle collision. In this case where there is provided an allowance for the bracket to slidingly move a predetermined distance backward until it is guided downward by the guide surface, it is particularly important to reliably move backward the bracket in order to ensure the desired capability to angularly move the pedal lever. As described above, since the support structure of the present invention includes the relative shift restricting member, this allows the bracket to reliably move backward. Therefore, the support structure of the present invention is very effective if it has the above allowance for sliding movement of the bracket.

The pedal assembly support structure may be configured so that the bracket has two sidewalls disposed to interpose the pedal lever therebetween in the width direction of the vehicle, both ends of the pivot shaft for the pedal lever extend in the width direction of the vehicle beyond the two sidewalls, respectively, of the bracket, and the relative shift restricting member is provided on the guide member to engage, beyond the outside surfaces of both the sidewalls of the bracket, with both the extending ends of the pivot shaft.

Since the relative shift restricting member is engaged with both the extending ends of the pivot shaft beyond the outside surfaces of both the sidewalls of the bracket, it becomes possible to effectively restrain the bracket and the guide member from relatively shifting in directions in which they will be flexed toward each other. This is effective particularly in offset collisions.

In the pedal assembly support structure, the relative shift restricting member may comprise a pair of restriction tabs having hooked shapes which circumferentially partly surround the extending ends of the pivot shaft and the rear sides of which are open.

Since the restriction tabs circumferentially partly surround the extending ends of the pivot shaft, it becomes possible to effectively restrain the bracket and the guide member from relatively shifting in directions in which they will be flexed toward each other. Further, since the rear sides of the restriction tabs are open, the relative backward movement of the bracket is not restrained at all. Therefore, the bracket can smoothly move backward in a vehicle collision.

The pedal assembly support structure may further comprise a relative position restricting member fixed to both the extending ends of the pivot shaft to come into surface contact with the outside surfaces of the restriction tabs and thereby restrict the relative position of the pivot shaft to the guide member.

Since the relative position restricting member is fixed to both the extending ends of the pivot shaft to come into surface contact with the outside surfaces of the restriction tabs of the guide member, the relative position of the pivot shaft to the guide member can be held. Further, since the pivot shaft for the pedal lever is mounted to the bracket, the relative position of the bracket to the guide member can be held through the pivot shaft for the pedal lever. This makes it further difficult for an offset collision to cause a flexion between the bracket and the guide member. Therefore, the bracket can move backward relatively to the guide member with higher reliability.

In the pedal assembly support structure, the relative position restricting member may comprise a pair of metal nuts having flat surfaces coming into surface contact with the outside surfaces of the restriction tabs, respectively.

Since the flat surfaces of the metal nuts come into surface contact with the outside surfaces of the restriction tabs, respectively, the relative position of the pivot shaft to the guide member can be effectively held, which makes it difficult for a flexion to arise between the bracket and the guide member.

In the pedal assembly support structure, the flat surfaces of the nuts may come into surface contact with the outside surfaces of the restriction tabs through low-friction members, respectively, having a lower coefficient of friction than metal.

With this structure, the contact surfaces of each restriction tab and the adjacent nut provide low-friction surfaces. Therefore, in a vehicle collision, the bracket can smoothly move backward and reliably disengage from the guide member.

In the pedal assembly support structure, the flat surface of each of the nuts may have a circular shape.

Since the flat surface of each nut in surface contact with the adjacent restriction tab is circular, the contact radius between the nut and the restriction tab is substantially equal in all directions other than the vehicle rearward direction. Therefore, even if the load of collision acts in any direction offset from the vehicle front-to-rear direction, the relative position of the bracket to the guide member can be held. This makes it difficult for a flexion to arise between the bracket and the guide member.

In the pedal assembly support structure, the relative shift restricting member preferably engages, forward of the fixing mechanism, with the pivot shaft for the pedal lever.

For example, when the relative shift restricting member is used to restrain the bracket from relatively shifting to the guide member in directions in which they will be flexed toward each other, the greatest force is applied to right above the relative shift restricting member. Therefore, if the relative shift restricting member and the fixing mechanism are located on the same vertical line orthogonal to the vehicle front-to-rear direction, the greatest force is applied to the fixing mechanism.

However, if the fixing mechanism is placed off the relative shift restricting member in the vehicle front-to-rear direction, it is avoided that the greatest force applies to the fixing mechanism. This ensures that the relative shift restricting member restrains the rear end portion of the bracket from relatively shifting to the front end portion of the guide member in any direction other than the vehicle rearward direction and that the bracket disengages from the guide member to move backward.

In the pedal assembly support structure, the guide member may have a weakened part provided rearward of the fixing mechanism.

For example, when such a collision load that would otherwise cause the bracket to relatively shift in any direction other than the vehicle rearward direction to the guide member is input to the bracket, the relative shift is restrained by the relative shift restricting member. However, if the collision load is relatively large, the restraint of the relative shift restricting member on relative shift might adversely cause breakage of the fixing mechanism. To cope with this, the guide member in this embodiment has a weakened part formed rearward of the fixing mechanism, in other words, at a position on the guide member other than the fixing mechanism. Therefore, when a relatively large collision load is input to the bracket, the weakened part is first damaged or broken to avoid the breakage of the fixing mechanism. As a result, the bracket can reliably move backward relative to the guide member.

In the pedal assembly support structure, the weakened part is preferably provided between the fixing mechanism and the guide surface.

In this case, breakage of the fixing mechanism and breakage of the guide member can be both avoided. This ensures that the bracket moves backward relative to the guide member and that the bracket is guided downward by the guide surface.

In the pedal assembly support structure, the weakened part may comprise a cutaway extending substantially orthogonally to the guide surface.

Thus, it can be effectively avoided that the guide surface is deformed or broken.

In the pedal assembly support structure, it is preferable that the input point of energy of collision input from the dash panel to the bracket in a vehicle collision is located below the pivot shaft for the pedal lever and the fixing mechanism is placed off the oblique line connecting the input point and the pivot shaft for the pedal lever as seen in the width direction of the vehicle.

In vehicle collisions, the collision load is transmitted along the oblique line connecting the input point and the pivot shaft for the pedal lever. Therefore, if the fixing mechanism is placed off the oblique line, this prevents the collision load from being input directly to the fixing mechanism, which avoids damage or breakage of the fixing mechanism. As a result, the bracket can reliably move backward relative to the guide member.

In the pedal assembly support structure, the relative shift restricting member may be provided in an overlapping region of the rear end portion of the bracket and the front end portion of the guide member to restrict the relative position of the bracket to the guide member.

Since the relative shift restricting member is provided in an overlapping region of the rear end portion of the bracket and the front end portion of the guide member, the relative shift restricting member restricts the relative position of the bracket to the guide member, for example, even if the load input from the dash panel to the bracket is inclined in the vehicle width direction or vertical direction to the vehicle front-to-rear direction. Thus, the bracket is less likely to shift in any direction other than the vehicle rearward direction. As a result, even in any offset collision, the bracket can reliably move backward relative to the guide member.

The relative shift restricting member may be provided in overlapping regions of the restriction tabs and the corresponding sidewalls of the bracket.

Since the pivot shaft for the pedal lever engages with the restriction tabs of the guide member, the bracket is less likely to relatively shift in any direction other than the vehicle rearward direction to the guide member. Since the relative shift restricting member is additionally provided in overlapping regions of the restriction tabs and the corresponding sidewalls of the bracket, the bracket can more reliably move backward relative to the guide member in an offset collision.

The relative shift restricting member may be provided to be off the fixing mechanism in the front-to-rear direction of the vehicle.

Thus, even if a large collision load acts on the bracket, it can be dispersed by transmitting it to the guide member through the relative shift restricting member and the pivot shaft for the pedal lever. The collision load acting on the fixing mechanism can be reduced accordingly, which prevents breakage or deformation of the fixing mechanism.

The relative shift restricting member may comprise projections formed at both sides of the bracket in the width direction of the vehicle to project from at least one of the bracket or the guide member and come into point contact with the bracket or the guide member.

In this case, since the relative shift restricting member comes into point contact with the bracket or the guide member, the bracket or the guide member has only a small friction resistance when the bracket move backward in a vehicle collision. Therefore, the bracket can smoothly disengage from the guide member.

The relative shift restricting member may comprise projections formed at both sides of the bracket in the width direction of the vehicle to project from at least one of the bracket or the guide member and come into point contact with the bracket or the guide member, two or more said projections being formed along a certain direction at each of both sides of the bracket.

In this case, since a plurality of projections are formed along a certain direction at each side of the bracket, this is effective when a collision load acts on the bracket in any direction offset from the certain direction.

DETAILED DESCRIPTION OF THE INVENTION

Embodiments of the present invention will be described below with reference to the drawings.

Figure 1:
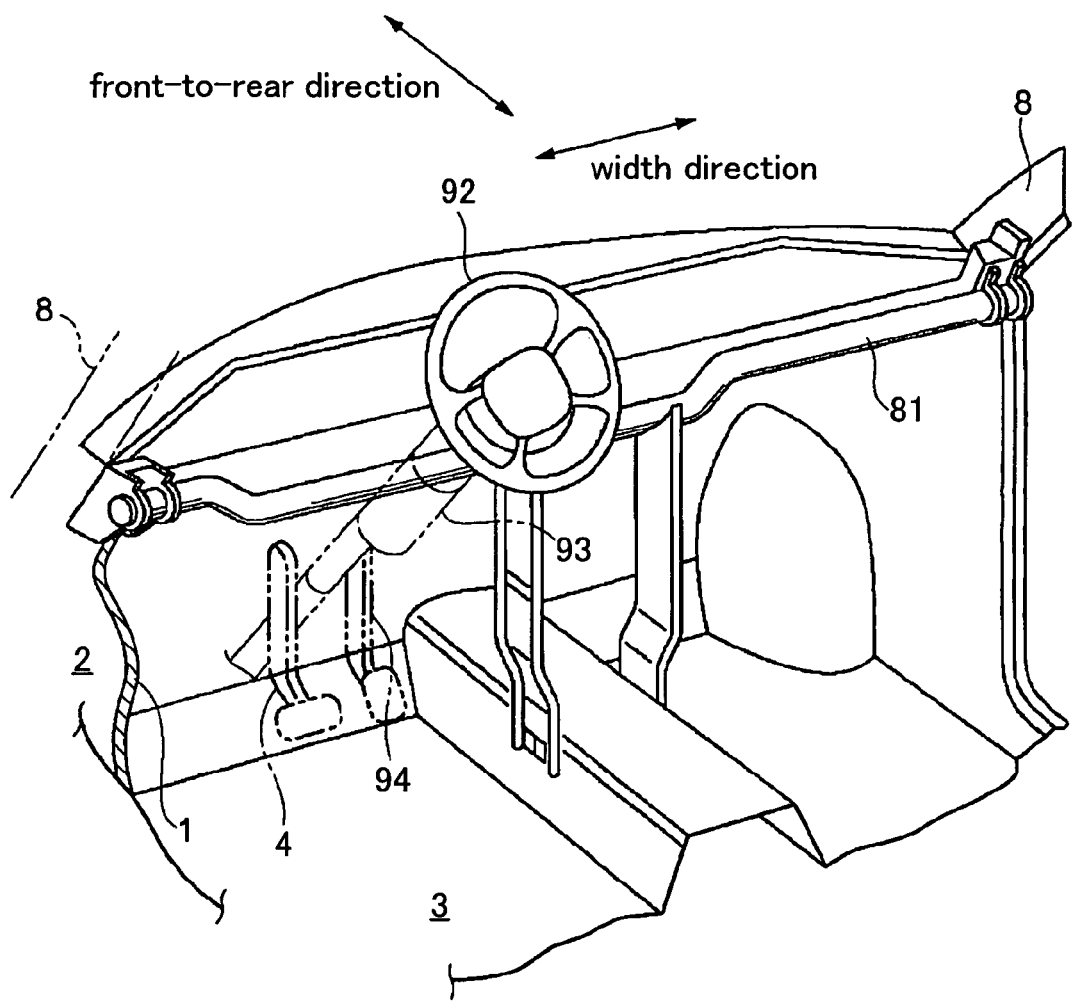
FIG. 1 is a schematic view showing the front part of a passenger room of a car (left-hand drive car) equipped with a brake pedal assembly to which a vehicle pedal assembly support structure of the present invention is applied.
Figure 2:
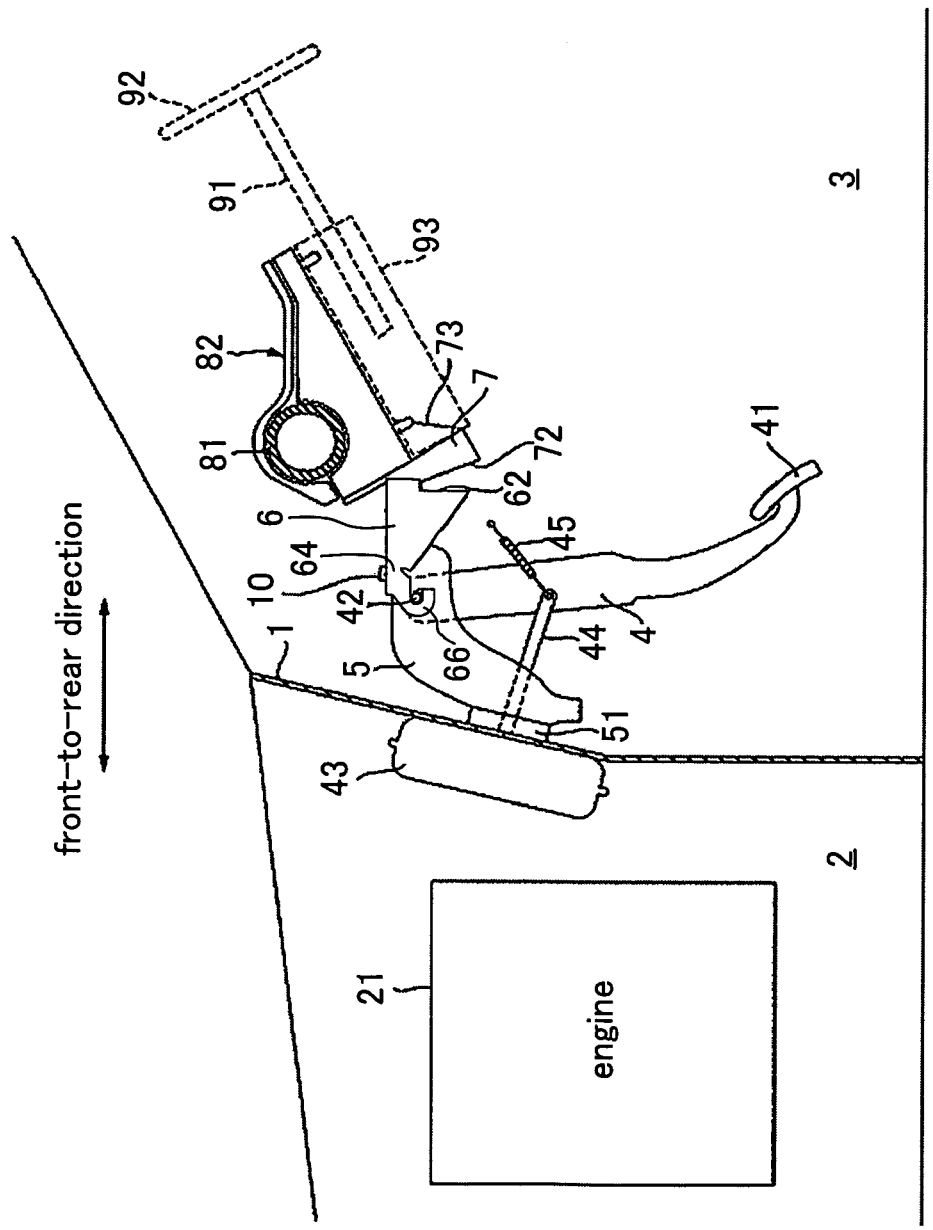
FIG. 2 is a schematic side view showing an embodiment of the vehicle pedal assembly support structure of the present invention.

As shown in FIGS. 1 and 2, a dash panel 1 constituting part of a car body separates an engine room 2 located on the front thereof in the front-to-rear direction of the vehicle (left side of FIG. 2) and a passenger room 3 located on the rear thereof in the front-to-rear direction of the vehicle (right side of FIG. 2). The engine room 2 accommodates an engine 21. Hereinafter, "forward (or the front) in the front-to-rear direction of the vehicle" is referred to simply as "forward (or the front)" and "rearward (or the rear) in the front-to-rear direction of the vehicle" is referred to simply as "rearward (or the rear)".

In an upward position in the front part of the passenger room 3 located to the front end thereof and rearward of the dash panel 1, an instrument panel reinforcement 81 and an instrument panel member 82 are placed to extend in the vehicle width direction. The instrument panel reinforcement 81 is supported at both ends to a pair of front pillars 8 and 8 provided at right and left sides of the car body. The instrument panel member 82 is fixed to the instrument panel reinforcement 81. The instrument panel reinforcement 81 and instrument panel member 82 have a greater stiffness than the dash panel 1 to provide a structure that does not move backward in a vehicle collision in order to secure a space for passengers in the passenger room 3 in the vehicle collision.

A brake pedal lever 4 operable by a stepping action of a driver is disposed rearward of the dash panel 1, specifically, in a downward position in the front part of the passenger room 3 located to the front end thereof. The brake pedal lever 4 is supported to the later-described pedal bracket 5 for angular movement about the axis of a pivot shaft 42 extending along the vehicle width direction.

In FIGS. 1 and 2, reference numeral 91 denotes a steering shaft placed off the brake pedal lever 4 in the vehicle width direction to extend obliquely from a forward and downward position in the front part of the passenger room 3 to a rearward and upward position, reference numeral 92 denotes a steering wheel mounted to the rear end of the steering shaft 91, reference numeral 93 denotes a steering support fixed to the instrument panel member 82 to support the steering shaft 91, and reference numeral 94 denotes an accel pedal.

Next, a pedal assembly support structure according to a first embodiment of the present invention will be described with reference to FIGS. 2 to 5.

The brake pedal lever 4 is placed rearward of the dash panel 1 to extend vertically. The brake pedal lever 4 is provided at its lower end with a pedal 41 operable by a stepping action of a driver's foot, and provided at its upper end with a pivot shaft 42 extending in the vehicle width direction to support the brake pedal lever 4 for angular movement in the vehicle front-to-rear direction. An operating rod 44 is connected to a substantially middle point of the brake pedal lever 4 between the pedal 41 and the pivot shaft 42 to pass through the dash panel 1 from a master back 43 fixed at the rear end of the engine room 2 to the dash panel 1 and extend into the passenger room. A coil spring 45 is connected to the substantially middle poison of the brake pedal lever 4 to bias the brake pedal lever 4 rearward.

The pedal bracket 5 consists of a substantially plate-shaped dash panel fixing part 51 located at the front end thereof, and a body 52 extending rearward and upward from the dash panel fixing part 51. The body 52 has two sidewalls 53 and 53 disposed to interpose the brake pedal lever 4 therebetween in the vehicle width direction, and a connecting part 54 connecting the upper ends of both the sidewalls 53 and 53 in the vicinity of their rear ends.

The pedal bracket 5 is fixed to the dash panel 1 by fastening the dash panel fixing part 51 to the rear surface of the dash panel 1 and also fixed to the instrument panel reinforcement 81 through the later-described guide member 6 by fixing the connecting part 54 to the guide member 6 with two through bolts 10 and 10.

The connecting part 54 is formed with two slits 55 and 55 a predetermined distance spaced away from each other in the vehicle width direction and extending rearward from the front edge of the connecting part 54. The width of each slit 55 is selected to be narrower than the head of the through bolt 10 and wider than the shaft thereof.

The sidewalls 53 and 53 are formed at positions toward their rear ends with through holes 56 and 56, respectively, through which the pivot shaft 42 for the brake pedal lever 4. The pivot shaft 42 for the brake pedal lever 4 is placed to pass through the through holes 56 and 56 and span the two sidewalls 53 and 53, so that the brake pedal lever 4 is supported to the pedal bracket 5 for angular movement about the axis of the pivot shaft 42 extending in the vehicle width direction. In this state, both ends of the pivot shaft 42 extend out beyond the sidewalls 53 and 53 in the vehicle width direction.

Figure 3:
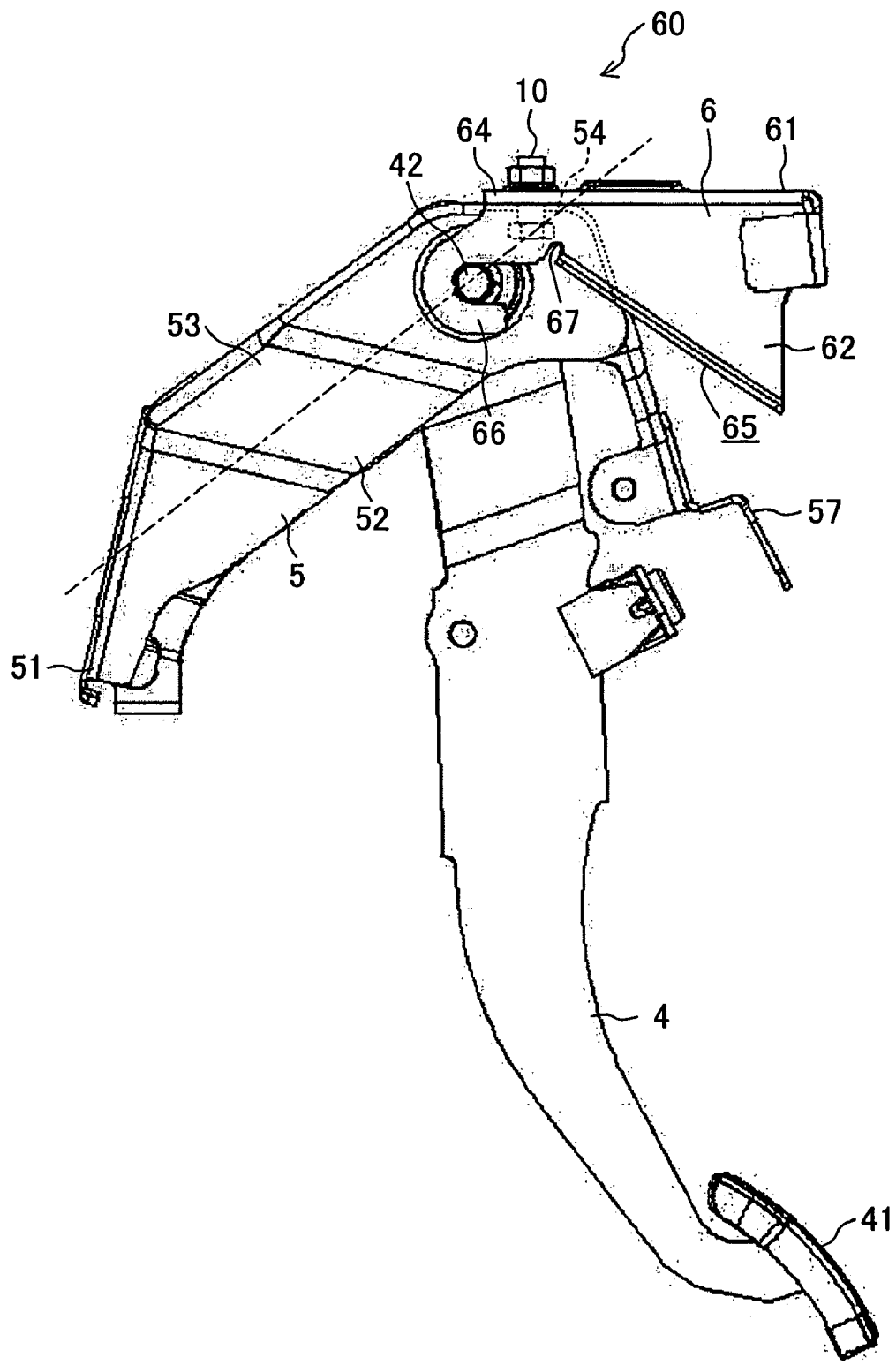
FIG. 3 is an enlarged side view showing a part of the support structure according to a first embodiment of the invention at which the brake pedal assembly is supported.
Figure 4:
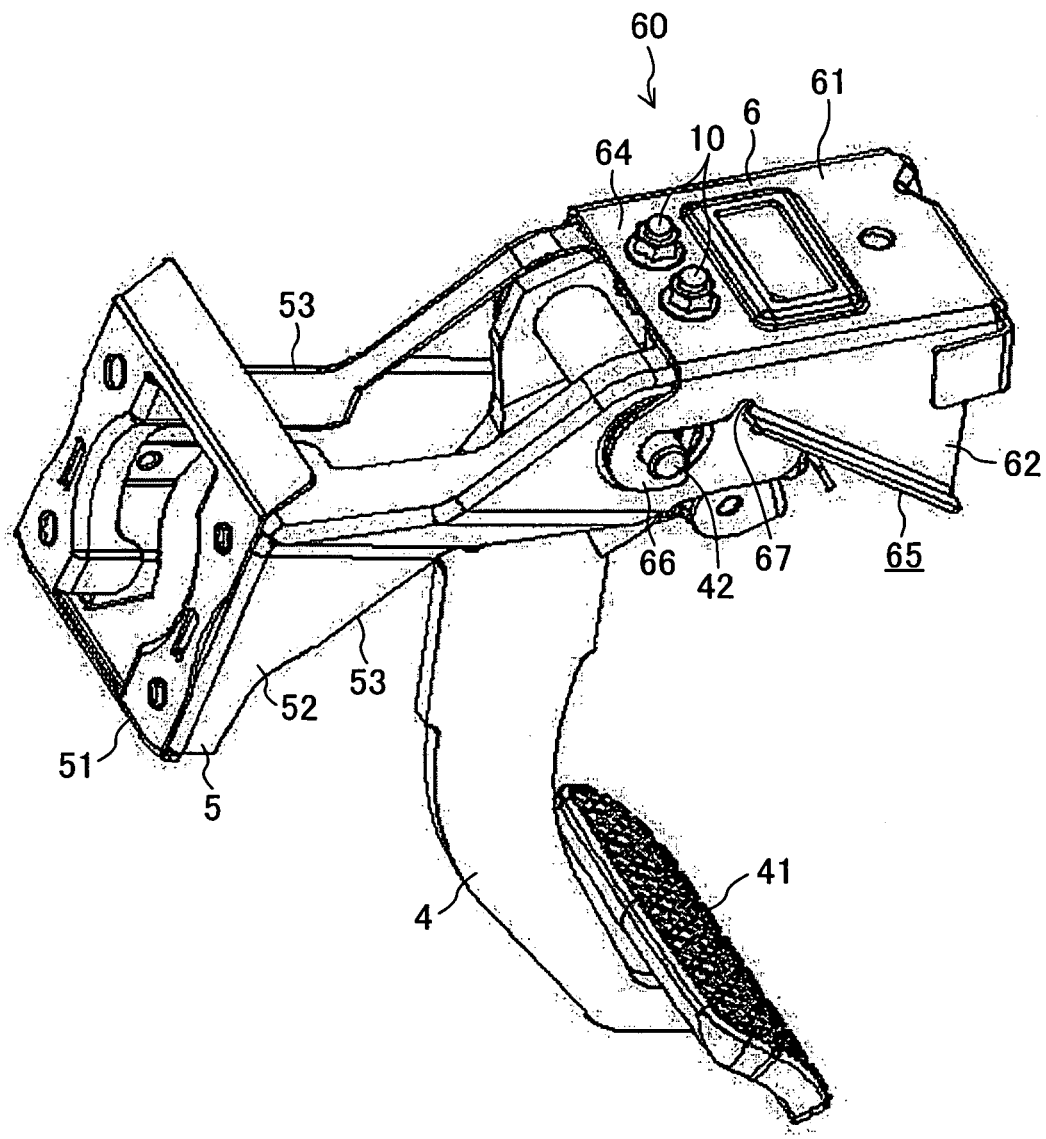
FIG. 4 is an enlarged perspective view showing the part of the support structure according to the first embodiment at which the brake pedal assembly is supported.
Figure 5:
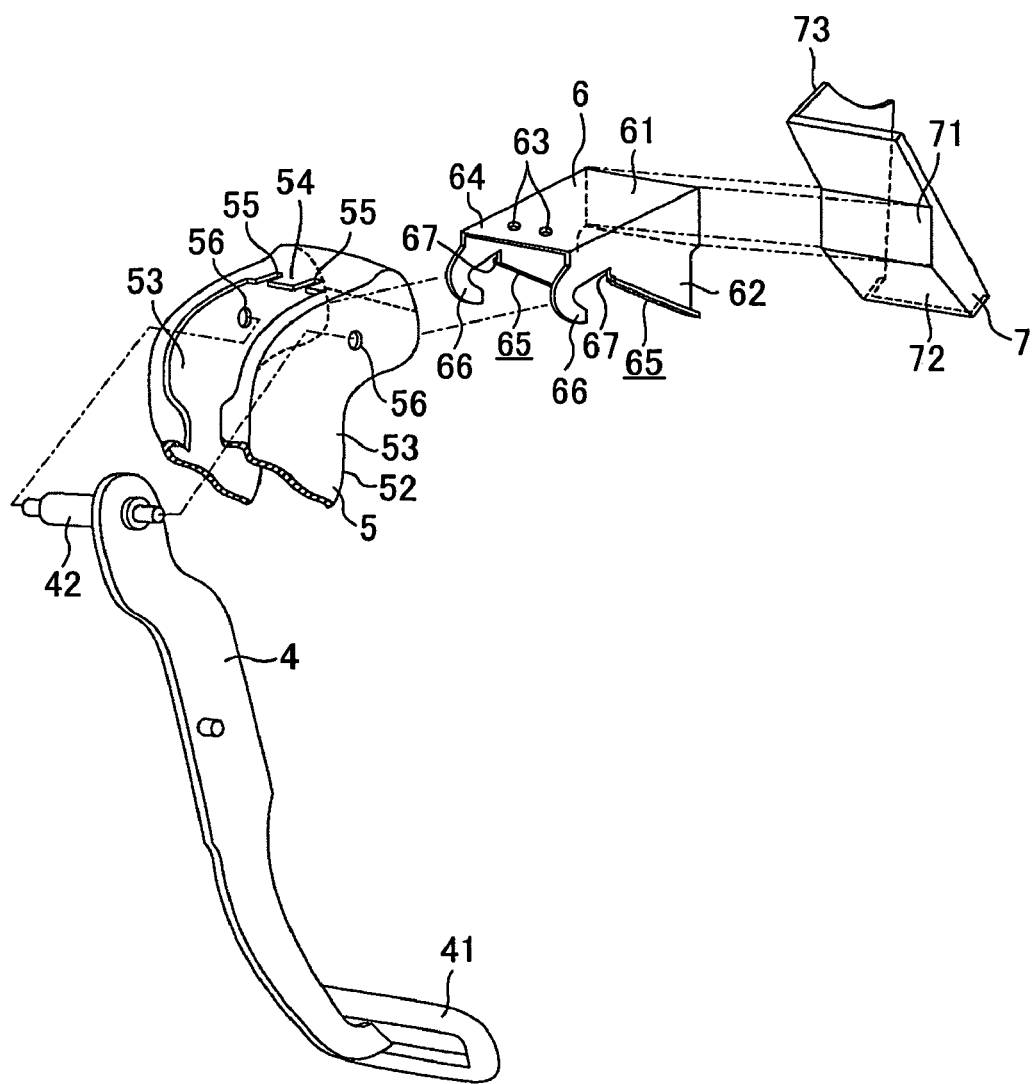
FIG. 5 is an exploded perspective view showing the part of the support structure according to the first embodiment at which the brake pedal assembly is supported.

A brake switch mounting bracket 57 for mounting a brake switch thereto is attached to the rear end of the bracket 5 (shown only in FIG. 3).

A guide member 6 is placed at the rear of the pedal bracket 5. The guide member 6 has a horizontally extending upper wall 61 of rectangular shape and sidewalls 62 and 62 extending downward from both edges of the upper wall 61 opposed to each other in the vehicle width direction, and has a configuration in which the bottom is open, i.e., a cross-sectional configuration of an inverted U.

The guide member 6 is vertically overlapped at its front end portion with a rear end portion of the pedal bracket 5, and is mounted at its rear end to a car body side mounting member 7 fixed to the instrument panel reinforcement 81. Thus, the guide member 6 is fixed relatively to the instrument panel reinforcement 81 through the car body side mounting member 7.

A front end portion of the upper wall 61 is formed with two bolt holes 63 and 63, through which the through bolts 10 and 10 are inserted, at a predetermined distance from each other in the vehicle width direction. The front end portion of the upper wall 61 is situated above the connecting part 54 of the pedal bracket 5 formed with the slits 55 and 55 and constitutes a support 64 for supporting the pedal bracket 5 to move it downward and then drop it out in a vehicle collision.

From this regard, the slits 55 and 55 of the pedal bracket 5, the support 64 of the guide member 6 formed with the bolt holes 63 and 63 and the through bolts 10 and 10 constitute a slidable fixing mechanism 60 for fixing the pedal bracket 5 to the guide member 6 such that in a vehicle collision, the pedal bracket 5 can move backward and disengage from the guide member 6.

The sidewalls 62 and 62 of the guide member 6 have respective lower edges inclined so that their fronts are higher than their rears, and each have a substantially triangular general shape as seen in the vehicle width direction. In each sidewall 62, part of the lower edge rearward of the support 64 is bent out in the vehicle width direction and the bottom surface of the bent-out part forms a guide surface 65 inclined at a predetermined angle to the horizontal direction. In a vehicle collision, the guide surfaces 65 and 65 of both the sidewalls 62 and 62 guide the backwardly moving pivot shaft 42 for the brake pedal lever 4 downward.

Further, the sidewalls 62 and 62 of the guide member 6 are provided with restriction tabs 66 and 66 extending forward from their front ends, respectively. The restriction tabs 66 and 66 engage with the respective ends of the pivot shaft 42 for the brake pedal lever 4 which extend out beyond the sidewalls 53 and 53 of the pedal bracket 5 in the vehicle width direction. Each restriction tab 66 has a hooked shape which circumferentially partly surrounds the extending end of the pivot shaft 42 and the rear side of which is open.

Furthermore, each of the sidewalls 62 and 62 of the guide member 6 is formed with a cutaway extending orthogonally to the guide surface 65 between the support 64 and the guide surface 65. The cutaway provides a weakened part 67 of the sidewall 62.

A car body side mounting member 7 is placed on the rear of the guide member 6. The car body side mounting member 7 is fixed to the instrument panel reinforcement 81.

The car body side mounting member 7 consists of a substantially vertically extending front wall of rectangular shape and two sidewalls extending rearward from the respective side edges of the front wall. The front wall includes a mounting part 71 located in the vertical middle of the front wall to mount the rear end of the guide member 6 thereon, and a guide part 72 located under the mounting part 71 to incline at a predetermined angle to the horizontal direction. Specifically, the guide part 72 is formed so that its angle of inclination to the horizontal direction is greater than that of the guide surface 65 of the guide member 6.

One of the two sidewalls of the car body side mounting member 7 (the sidewall located to the back of the paper in FIG. 5) is a fixed part 73 which is fixed to the instrument panel reinforcement 81. The fixed part 73 has an upper edge cut away in a substantially one-fourth sector to fit on the outer periphery of the instrument panel reinforcement 81 of circular cross section.

When the dash panel fixing part 51 of the pedal bracket 5 is fixed to the dash panel 1 and the guide member 6 is fixed relatively to the instrument panel reinforcement 81 through the car body side mounting member 7, the pedal bracket 5 and the guide member 6 are brought into an overlapped relation in which the connecting part 54 of the pedal bracket 5 lies beneath the support 64 of the guide member 6. When, in this relation, the through bolts 10 and 10 are inserted through the bolt holes 63 and 63 and slits 55 and 55 and the pedal bracket 5 and the guide member 6 are fastened with the through bolts 10 and 10, the rear end portion of the pedal bracket 5 is supported to the guide member 6.

In this manner, the brake pedal lever 4 supported to the pedal bracket 5 becomes pivotable about the axis of the pivot shaft 42. At this time, both ends of the pivot shaft 42 extend out beyond the sidewalls 53 and 53, respectively, of the pedal bracket 5 in the vehicle width direction and the hooked restriction tabs 66 and 66 are engaged with both the extending ends, respectively, of the pivot shaft 42.

With this support structure, when the pedal bracket 5 moves toward the rear of the vehicle owing to an input of load larger than a predetermined value in a vehicle collision, the through bolts 10 and 10 relatively move forward within the slits 55 and 55 and then come off therefrom. Thus, the pedal bracket 5 is disengaged from the guide member 6.

Next, description will be made of the behavior of the above pedal assembly support structure in a vehicle frontal collision with reference to FIGS. 6A to 6F.

When a load larger than the predetermined value acts on the dash panel 1 in a vehicle collision, the dash panel 1 significantly moves backward.

At this time, the instrument panel reinforcement 81 does not almost move backward because of its higher stiffness than that of the dash panel 1 and therefore the guide member 6 fixed indirectly to the instrument panel reinforcement 81 does also not almost move backward. On the other hand, the pedal bracket 5 fixed to the dash panel 1 significantly moves backward with the backward movement of the dash panel 1. As a result, the pivot shaft 42 normally engaged with the restriction tabs 66 and 66 relatively moves backward through the openings of the restriction tabs 66 and 66 (see FIGS. 6A and 6B).

In this case, even if the direction of a collision load input from the dash panel 1 to the pedal bracket 5 at the vehicle collision is inclined to the vehicle front-to-rear direction, for example, because the collision is an offset collision, the rear end portion of the pedal bracket 5 is restrained from relatively shifting in directions other than the rearward direction of the vehicle to the support 64 of the guide member 6. The reason is that the pivot shaft 42 for the brake pedal lever 4 is engaged with the restriction tabs 66 and 66 of the guide member 6. Therefore, the pedal bracket 5 certainly moves toward the rear of the vehicle relative to the support 64.

With the backward movement of the pedal bracket 5, the through bolts 10 and 10 are dislodged from the slits 55 and 55, respectively, as described above, so that the pedal bracket 5 can be dropped out of the guide member 6. In addition, with the backward movement of the pedal bracket 5, the pivot shaft 42 for the brake pedal lever 4 abuts on the guide surfaces 65 and 65 placed rearward of the support 64 of the guide member 6.

Figure 6:
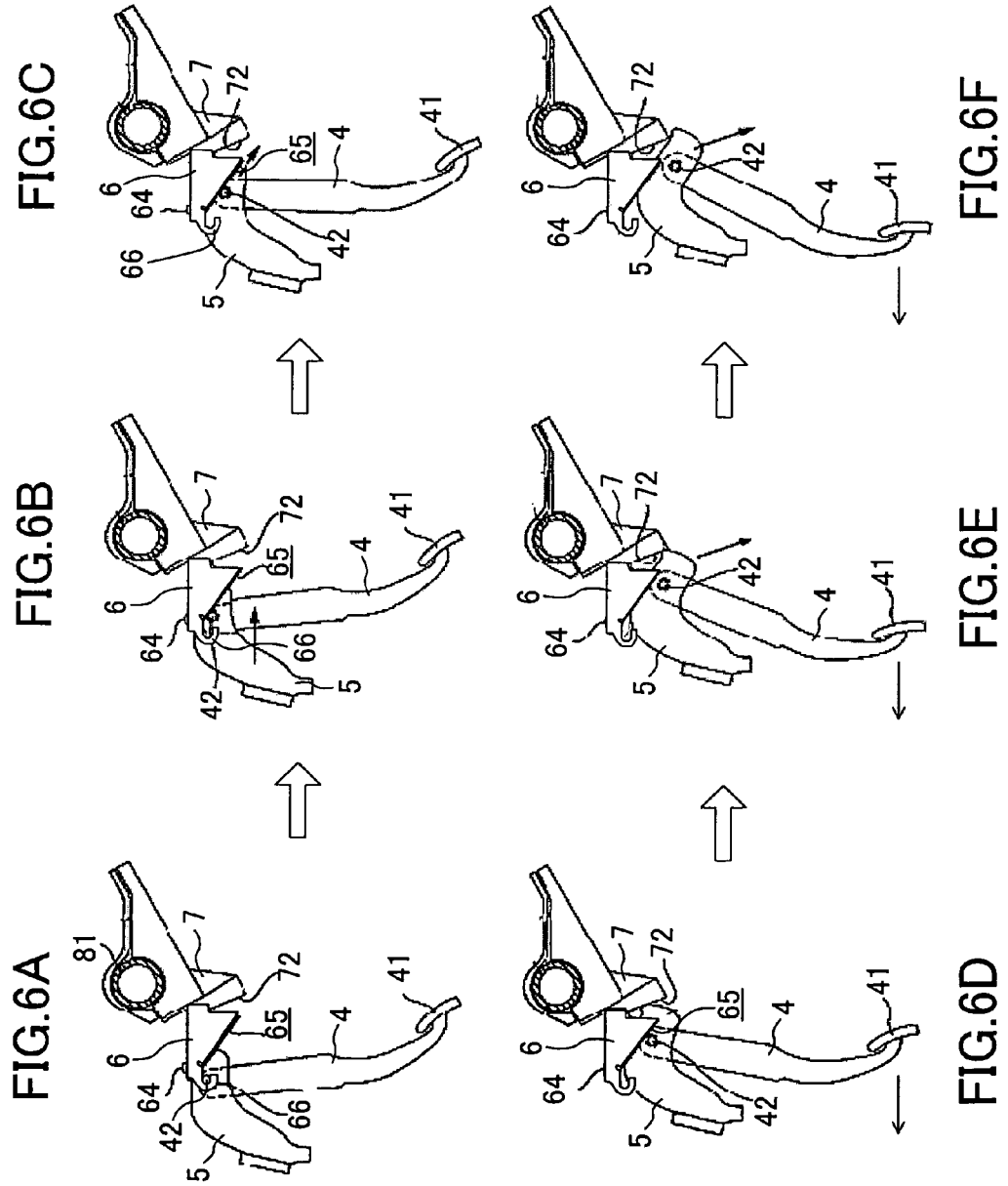
FIGS. 6A to 6F are illustrations showing how the pedal bracket moves in a vehicle collision.
Figure 7:
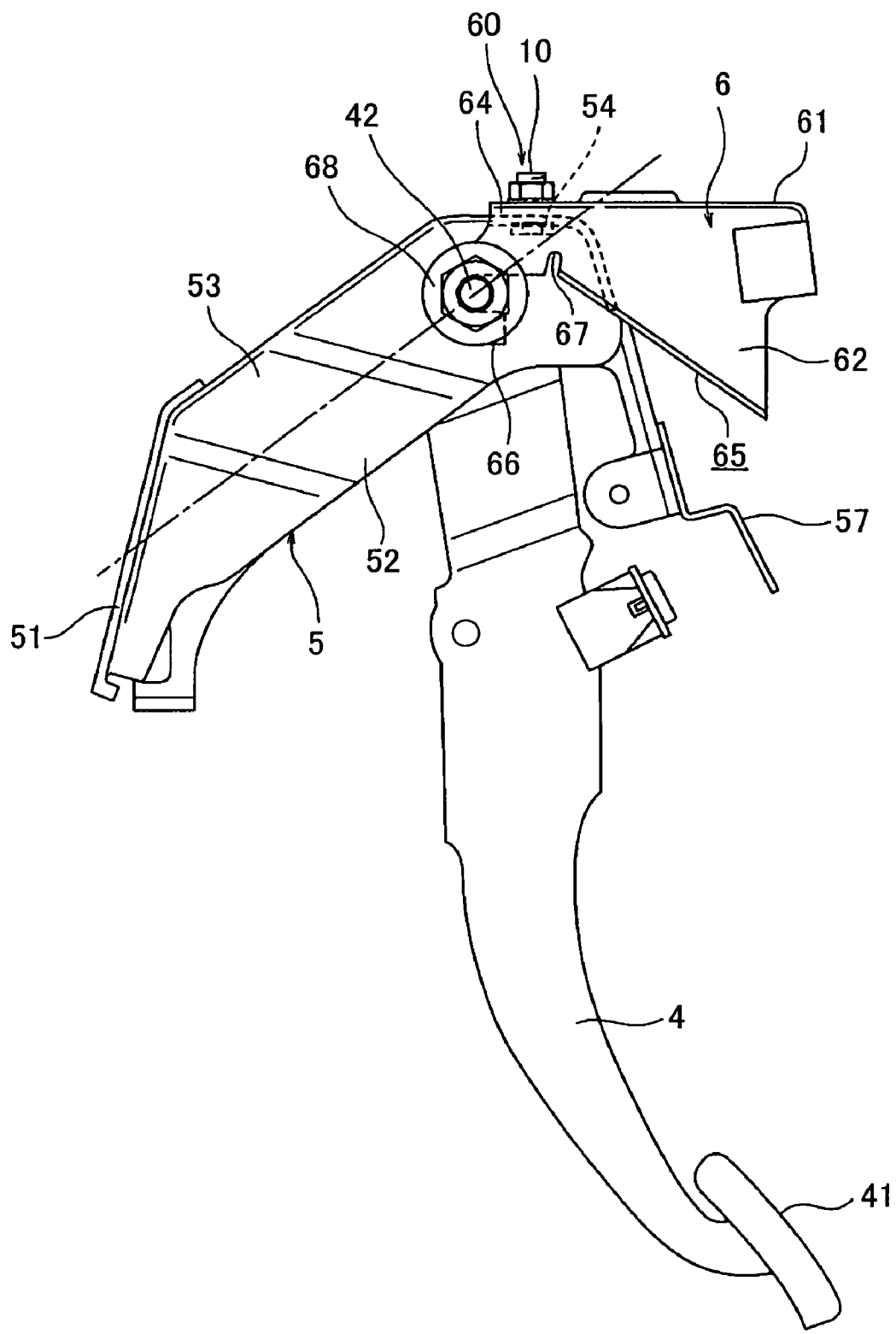
FIG. 7 is an enlarged side view showing a part of the support structure according to a second embodiment of the invention at which the brake pedal assembly is supported.
Figure 8:
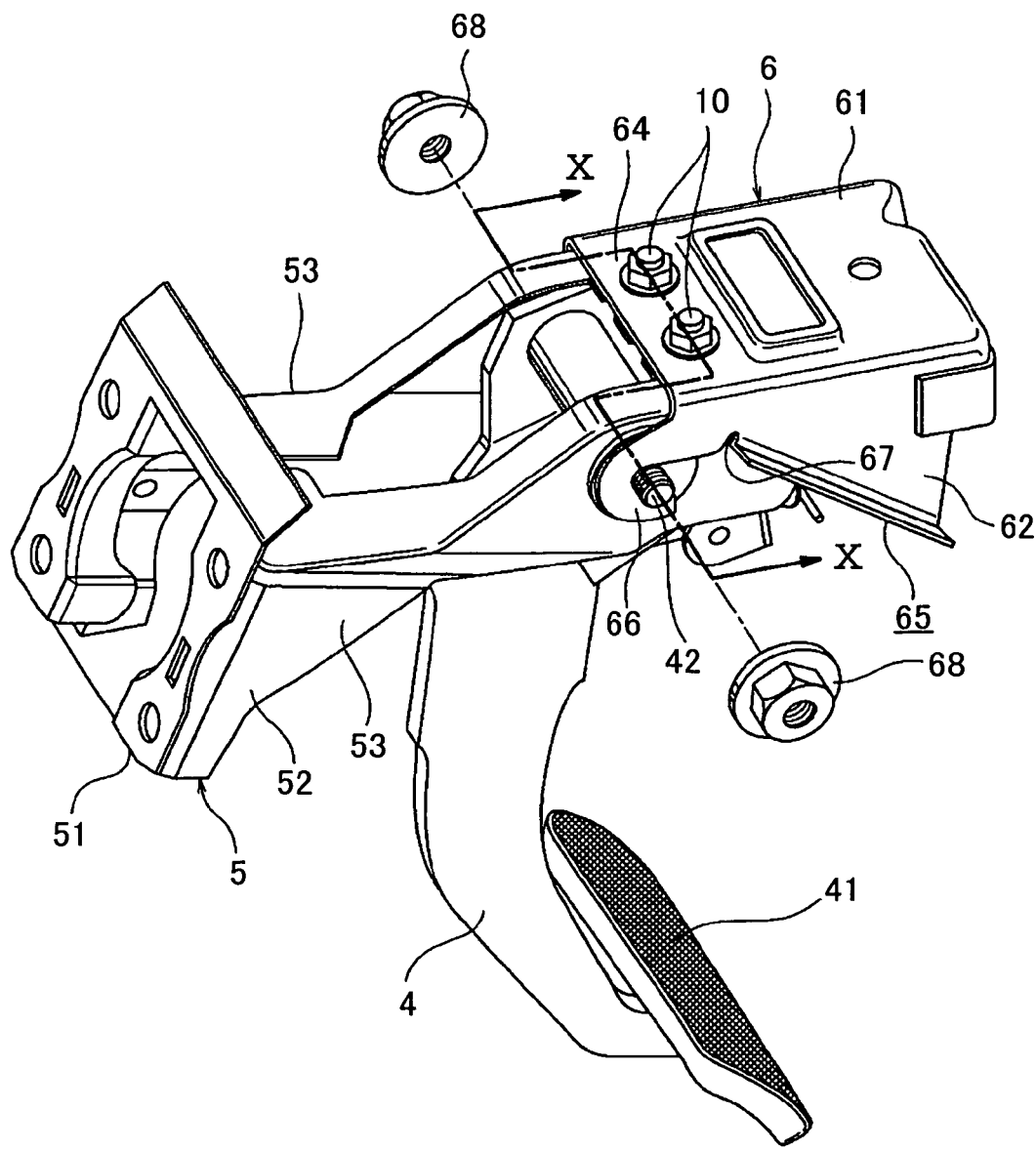
FIG. 8 is an enlarged perspective view showing the part of the support structure according to the second embodiment at which the brake pedal assembly is supported.
Figure 9:
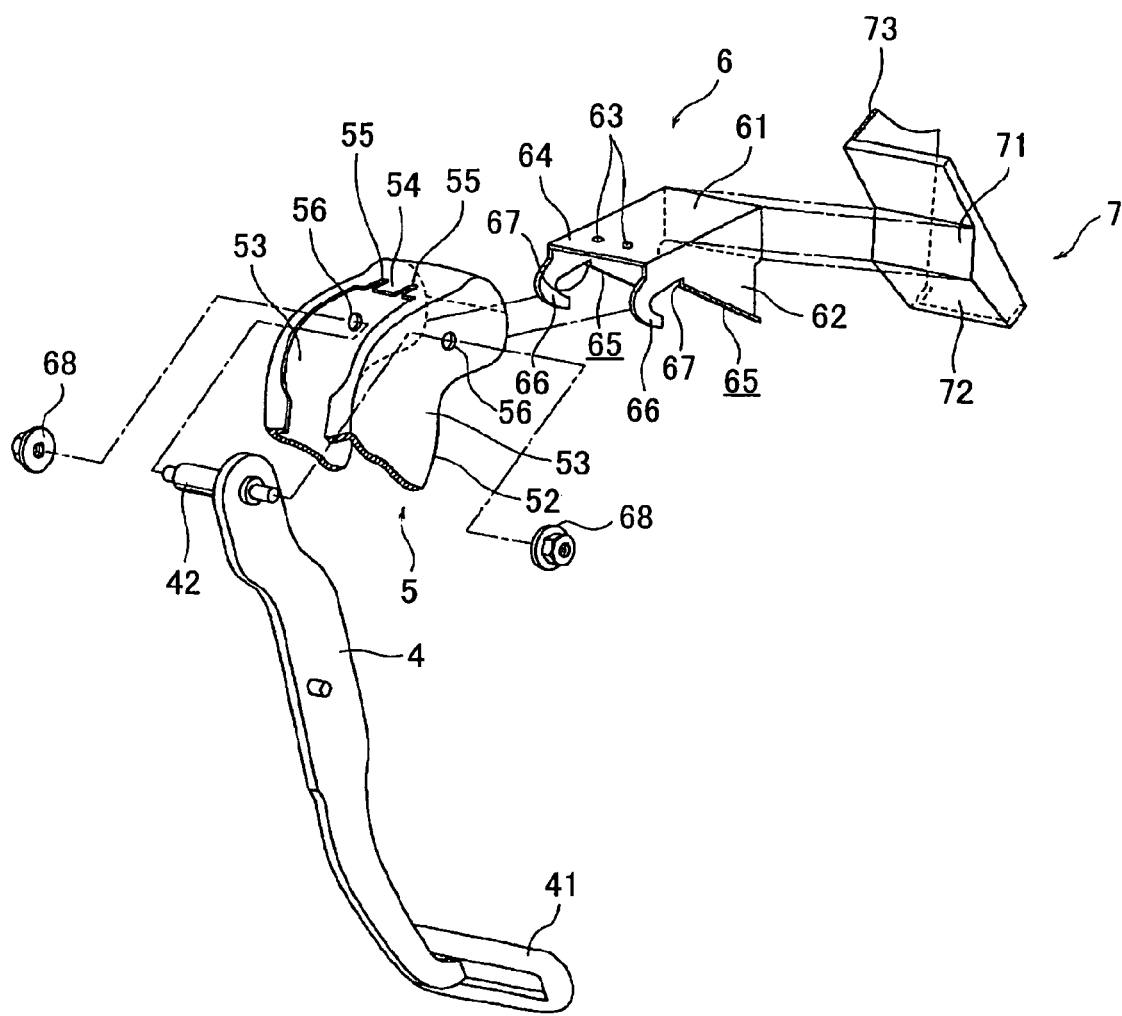
FIG. 9 is an exploded perspective view showing the part of the support structure according to the second embodiment at which the brake pedal assembly is supported.

As the pedal bracket 5 further moves backward, the pivot shaft 42 is guided gradually downward along the guide surfaces 65 and 65 (see FIGS. 6C and 6D) so that the brake pedal lever 4 pivots clockwise in FIG. 6. Thus, the pedal 41 of the brake pedal lever 4 moves forward.

When the pedal bracket 5 still further moves backward, the rear end of the pedal bracket 5 abuts on the guide part 72 of the car body side mounting member 7 so that the pedal bracket 5 is guided downward by the inclined guide part 72 (see FIGS. 6E and 6F). Since the guide part 72 has a larger angle of inclination to the horizontal direction than the guide surfaces 65 and 65 of the guide member 6, the brake pedal lever 4 further pivots clockwise and the pedal 41 further moves forward.

As seen from the above, with the pedal assembly support structure of this embodiment, the restriction tabs 66 and 66 provided on the guide member 6 can restrain the rear end portion of the pedal bracket 5 from shifting, relative to the support 64 of the guide member 6, in directions in which they will be flexed toward each other. This ensures that the pedal bracket 5 moves backward and that the pivot shaft 42 abuts on the guide surfaces 65 and 65. As a result, the brake pedal lever 4 can be angularly moved with reliability.

In particular, the pedal assembly support structure of this embodiment is a structure in which the pivot shaft 42 normally does not come in contact with the guide surfaces 65 and 65 but abuts on them after the backward movement of the pedal bracket 5 owing to a vehicle collision. Therefore, it is a structure that the rear end portion of the pedal bracket 5 is likely to shift, relative to the support 64 of the guide member 6, in directions in which they will be flexed toward each other. For this reason, it is particularly effective that the restriction tabs 66 and 66 restrain the rear end portion of the pedal bracket 5 from relatively shifting in directions other than the vehicle rearward direction to the support 64.

Further, since the restriction tabs 66 and 66 is engaged, at positions outside the sidewalls 53 and 53 of the pedal bracket 5, with both the extending ends of the pivot shaft 42 for the brake pedal lever 4, it can be effectively restrained that the pedal bracket 5 and the guide member 6 relatively shift in directions in which they will be flexed toward each other. This is advantageous in reliably pivoting the brake pedal lever 4 even in any offset collision.

Furthermore, since the restriction tabs 66 and 66 circumferentially partly surround the extending ends, respectively, of the pivot shaft 42, it can be effectively restrained that the pedal bracket 5 and the guide member 6 relatively shift in directions in which they will be flexed toward each other. In addition, since the restriction tabs 66 and 66 are open at their rears, this does not at all restrain the pedal bracket 5 from moving backward. Therefore, the pedal bracket 5 can be smoothly moved backward in a vehicle collision.

Furthermore, since the restriction tabs 66 and 66 is engaged, at positions forward of the slidable fixing mechanism 60 (support 64), with the pivot shaft 42, it is avoided that a large force is applied to the support 64 even when the pedal bracket 5 is restrained from shifting, relative to the guide member 6, in directions in which they will be flexed toward each other.

The dash panel fixing part 51 of the pedal bracket 5 is located below the pivot shaft 42 for the brake pedal lever 4, and the energy of collision input from the dash panel 1 to the pedal bracket 5 in a vehicle collision transmits the body 52 of the pedal bracket 5 along the straight line shown in the dot-dashed line in FIG. 3. Since the slidable fixing mechanism 60 (support 64) is offset from the straight line, the load of collision is not input directly to the support 64, which avoids undesirable damages of the slidable fixing mechanism 60 (support 64), such as breakage.

Furthermore, since weakened parts 67 and 67 are provided between the slidable fixing mechanism 60 (support 64) and the associated guide surfaces 65 and 65, the weakened parts 67 and 67 will be first broken when such a relatively large load of collision is input that the pedal bracket 5 would otherwise relatively shift in directions other than the vehicle rearward direction to the support 64. Therefore, it can be avoided that the slidable fixing mechanism 60 (support 64) and the guide surfaces 65 and 65 are first broken. As a result, the pedal bracket 5 can be relatively shifted in the vehicle rearward direction to the guide member 64.

Furthermore, since the weakened parts 67 and 67 are formed in cutaways extending orthogonally to the guide surfaces 65 and 65, this effectively avoids deformation or breakage of the guide surfaces 65 and 65.

Next, a pedal assembly support structure according to a second embodiment of the present invention will be described with reference to FIGS. 7 to 10. The same components as those of the pedal assembly support structure according to the first embodiment are indicated by the same reference numerals and the description thereof will be not given.

The second embodiment is different from the first embodiment mainly in that the support structure of the second embodiment has flanged nuts 68 and 68 fixed to both ends of the pivot shaft 42 for the brake pedal lever 4. The details will be described below.

As shown in FIGS. 7 to 10, metal flanged nuts 68 and 68 are fixed to both ends of the pivot shaft 42 for the brake pedal lever 4 to come into surface contact with the outside surfaces of the restriction tabs 66 and 66 of the guide member 6. The flat surfaces of the flanges of the flanged nuts 68 and 68 (the flat surfaces thereof in contact with the restriction tabs 66 and 66 of the guide member 6) are substantially circular. Therefore, each of the flanged nuts 68 and 68 is brought into surface contact with the associated restriction tab 66 of the guide member 6 to have substantially equal contact radii in all directions other than the vehicle rearward direction.

In this embodiment, both ends of the pivot shaft 42 for the brake pedal lever 4 are formed with external threads, while the inner surfaces of the flanged nuts 68 and 68 are formed with internal threads. The flanged nuts 68 and 68 are threadedly engaged on both ends of the pivot shaft 42 and bonded thereto by spot welding or other means. Alternatively, the pivot shaft 42 for the brake pedal lever 4 and the flanged nuts 68 and 68 may be formed with no threads and may be fixed together only by welding or other means.

Figure 10:
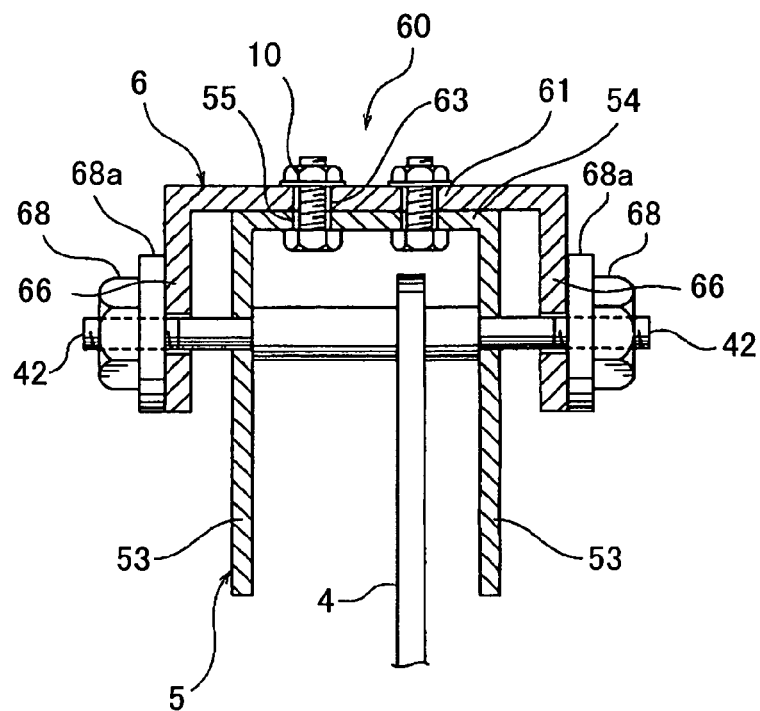
FIG. 10 is a partly cross-sectional view taken along the line X-X in FIG. 8.
Figure 11:
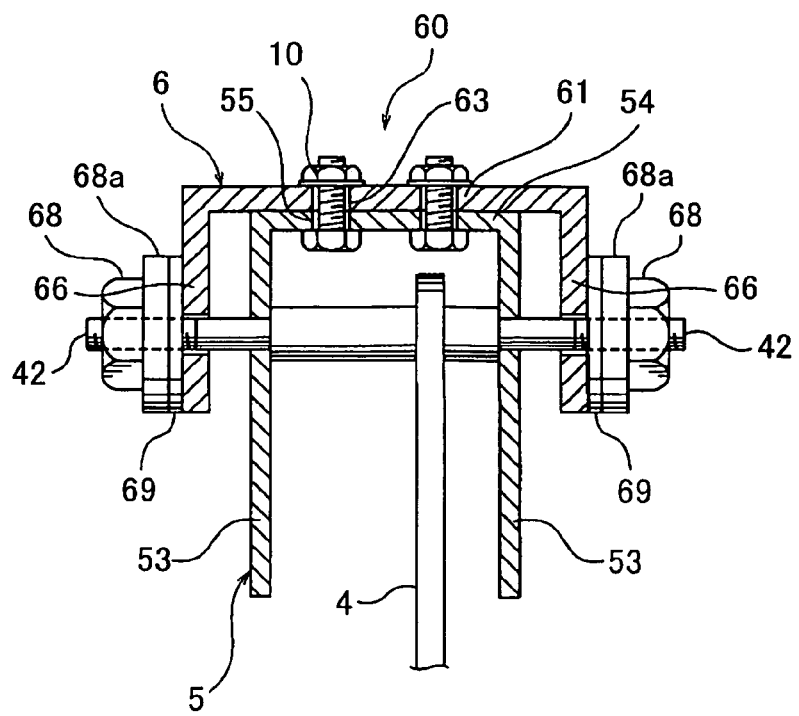
FIG. 11 is a view corresponding to FIG. 10, showing a pedal assembly support structure according to a variant of the second embodiment.

FIG. 11 is a cross-sectional view corresponding to FIG. 10, showing a variant of the second embodiment. As shown in the figure, the flat surface of each flanged nut 68 comes into surface contact with the associated restriction tab 66 of the guide member 6 through a low-friction member 69 having a lower coefficient of friction than metal. The low-friction member 69 is made, for example, from resin.

Next, description will be made of the behavior of the pedal assembly support structure of the second embodiment in a vehicle frontal collision.

When a load larger than the predetermined value acts on the dash panel 1 in a vehicle collision, the dash panel 1 significantly moves backward. The pedal bracket 5 fixed to the dash panel 1 significantly moves backward with the backward movement of the dash panel 1. As a result, the pivot shaft 42 normally engaged with the restriction tabs 66 and 66 (before a vehicle collision) relatively moves backward through the openings formed at the rears of the restriction tabs 66 and 66.

In this case, even if the direction of a collision load input from the dash panel 1 to the pedal bracket 5 at the vehicle collision is inclined vertically or laterally to the vehicle front-to-rear direction, for example, because the collision is an offset collision, the pedal bracket 5 is less likely to relatively shift in directions other than the rearward direction of the vehicle to the restriction tabs 66 and 66 of the guide member 6. The reason is that both ends of the pivot shaft 42 for the brake pedal lever 4 are partly surrounded by the restriction tabs 66 and 66 of the guide member 6.

Further, since the flanged nuts 68 and 68 are fixed to both ends of the pivot shaft 42 of the brake pedal lever 4 to come into surface contact with the outside surfaces of the restriction tabs 66 and 66, respectively, of the guide member 6, this holds the relative position of the pivot shaft 42 for the brake pedal lever 4 to the guide member 6. Furthermore, since the pivot shaft 42 for the brake pedal lever 4 is mounted to the pedal bracket 5, this holds the relative position of the pedal bracket 5 to the guide member 6. Therefore, the pedal bracket 5 is less likely to shift in directions other than the vehicle rearward direction. As a result, a flexion is less likely to arise between the pedal bracket 5 and the guide member 6 even in an offset collision and the pedal bracket 5 can reliably move toward the rear of the vehicle relative to the guide member 6.

With the backward movement of the pedal bracket 5, the through bolts 10 and 10 are dislodged from the slits 55 and 55, respectively, as described above, so that the pedal bracket 5 can be dropped out of the guide member 6. In addition, with the backward movement of the pedal bracket 5, the outer peripheries 68a and 68a of the flanges of the flanged nuts 68 and 68 fixed to both ends of the pivot shaft 42 for the brake pedal lever 4 abut on the guide surfaces 65 and 65, respectively, placed rearward of the support 64 of the guide member 6.

As the pedal bracket 5 further moves backward, the outer peripheries 68a and 68a of the flanges of the flanged nuts 68 and 68 fixed to both ends of the pivot shaft 42 are guided gradually downward along the guide surfaces 65 and 65 so that the brake pedal lever 4 pivots clockwise under a force of constraint of the operating rod 44. Thus, the pedal 41 of the brake pedal lever 4 moves forward.

When the pedal bracket 5 still further moves backward, the rear end of the pedal bracket 5 abuts on the guide part 72 of the car body side mounting member 7 so that the pedal bracket 5 is guided further downward by the inclined guide part 72.

As described above, in the vehicle pedal assembly support structure of the second embodiment, the flanged nuts 68 and 68 are fixed to both ends of the pivot shaft 42 for the brake pedal lever 4 to come into surface contact with the restriction tabs 66 and 66 of the guide member 6. Therefore, the relative position of the rear end portion of the pedal bracket 5 to each of the pivot shaft 42 for the brake pedal lever 4 and the support 64 of the guide member 6 is further restricted. This restriction of the relative position provides a reliable backward movement of the pedal bracket 5 and in turn a reliable abutment of the pivot shaft 42 for the brake pedal lever 4 on the guide surfaces 65 and 65 of the guide member 6. As a result, the brake pedal lever 4 can be pivoted with higher reliability.

If the flat surface of each flanged nut 68 comes into surface contact with the associated restriction tab 66 of the guide member 6 through the low-friction member 69 having a lower coefficient of friction than metal as shown in FIG. 11, this reduces the friction resistance of the guide member 6 when the pedal bracket 5 moves backward in a vehicle collision. Therefore, the pedal bracket 5 can smoothly disengage from the guide member 6.

Furthermore, since the flat surface of each flanged nut 68 in surface contact with the restriction tab 66 of the guide member 6 has a circular shape, the contact radius between the restriction tab 66 and the flat surface of the flanged nut 68 is substantially equal in the upward, downward and forward directions of the vehicle. Therefore, even if the collision load acts on the pedal bracket 5 in any offset directions, the relative position of the pedal bracket 5 can be held by the guide member 6 and the pivot shaft 42 for the brake pedal lever 4, which makes it difficult for a flexion to arise between the pedal bracket 5 and the guide member 6. As a result, the pedal bracket 5 can reliably move toward the rear of the vehicle relative to the guide member 6.

Next, a pedal assembly support structure according to a third embodiment of the present invention will be described with reference to FIGS. 12 to 14. The same components as those of the pedal assembly support structures according to the first and second embodiments are indicated by the same reference numerals and the description thereof will be not given.

The third embodiment is different from the first embodiment mainly in that the support structure of the third embodiment has projections 70 and 70 extending inwardly in the vehicle width direction on the inside surfaces of the restriction tabs 66 and 66, respectively, of the guide member 6. The details will be described below.

Figure 12:
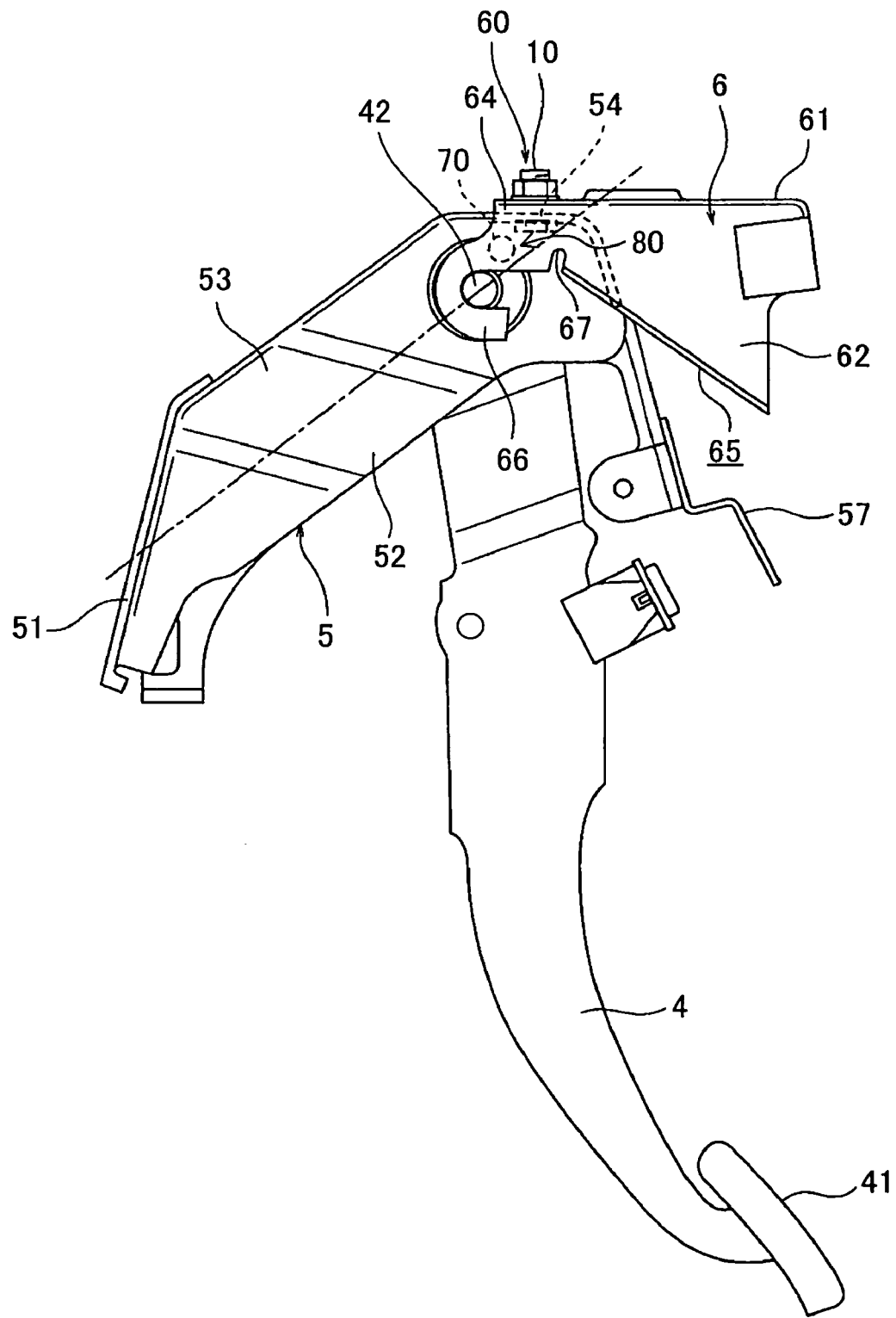
FIG. 12 is an enlarged side view showing a part of the support structure according to a third embodiment of the invention at which the brake pedal assembly is supported.
Figure 13:
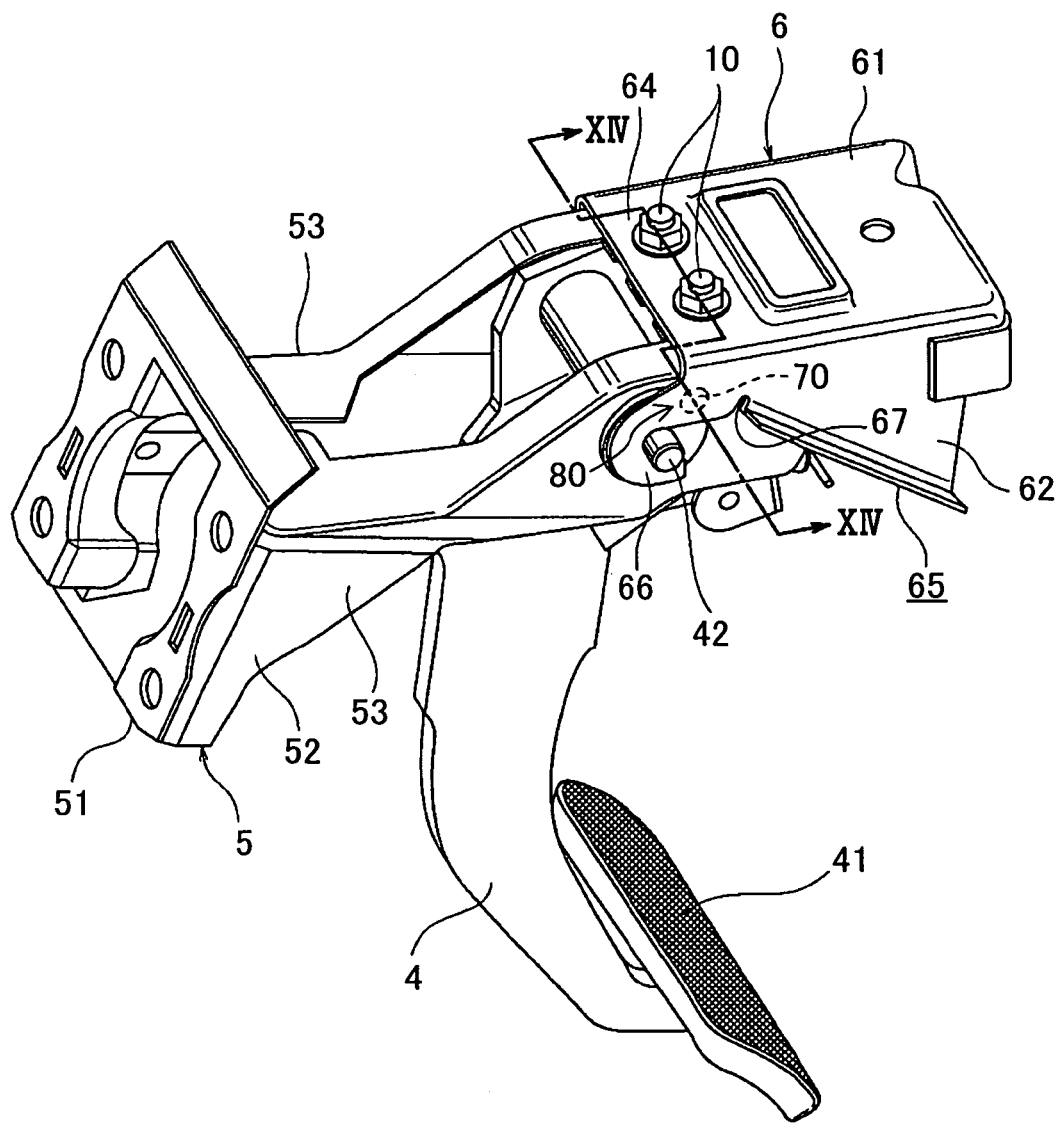
FIG. 13 is an enlarged perspective view showing the part of the support structure according to the third embodiment at which the brake pedal assembly is supported.
Figure 14:
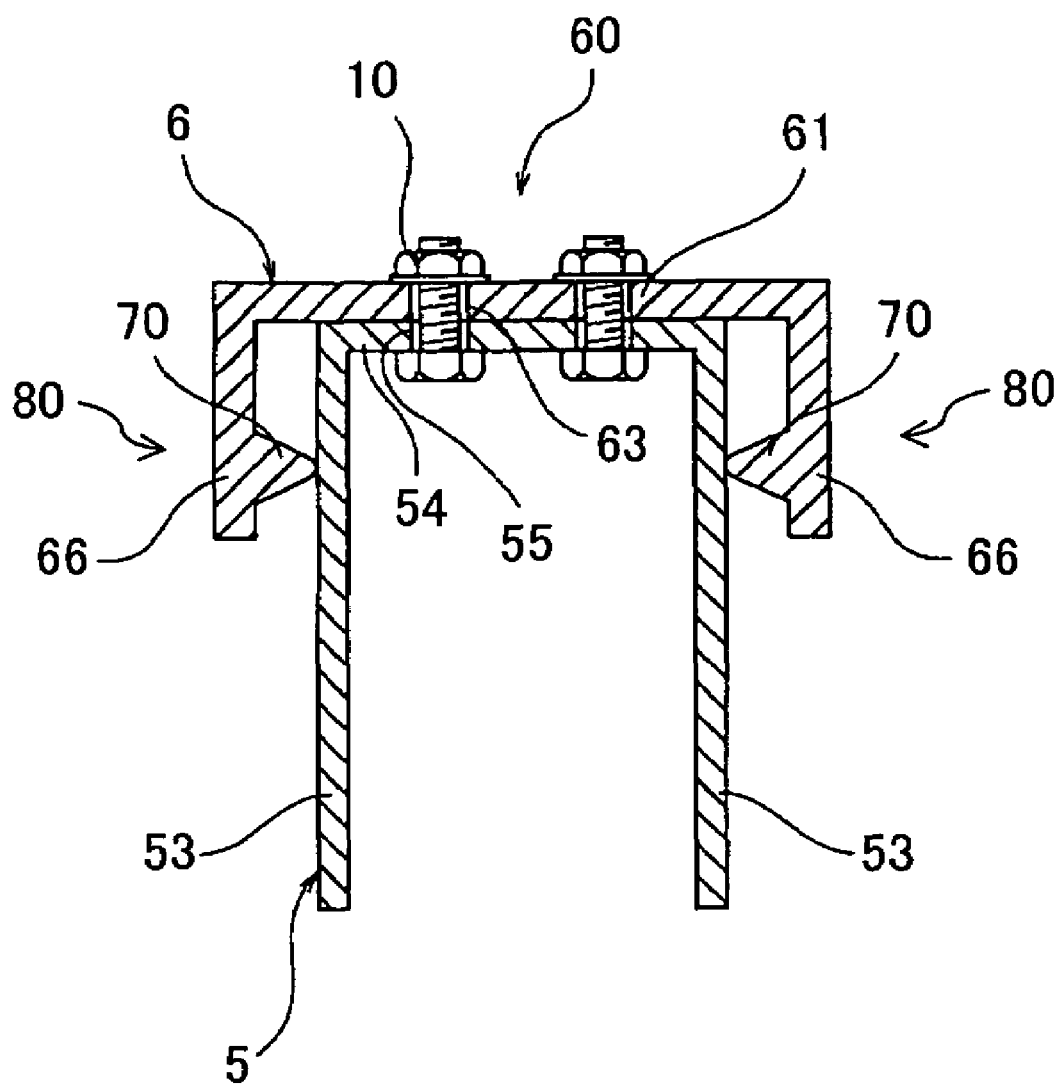
FIG. 14 is a partly cross-sectional view taken along the line XIV-XIV in FIG. 13.
Figure 15:
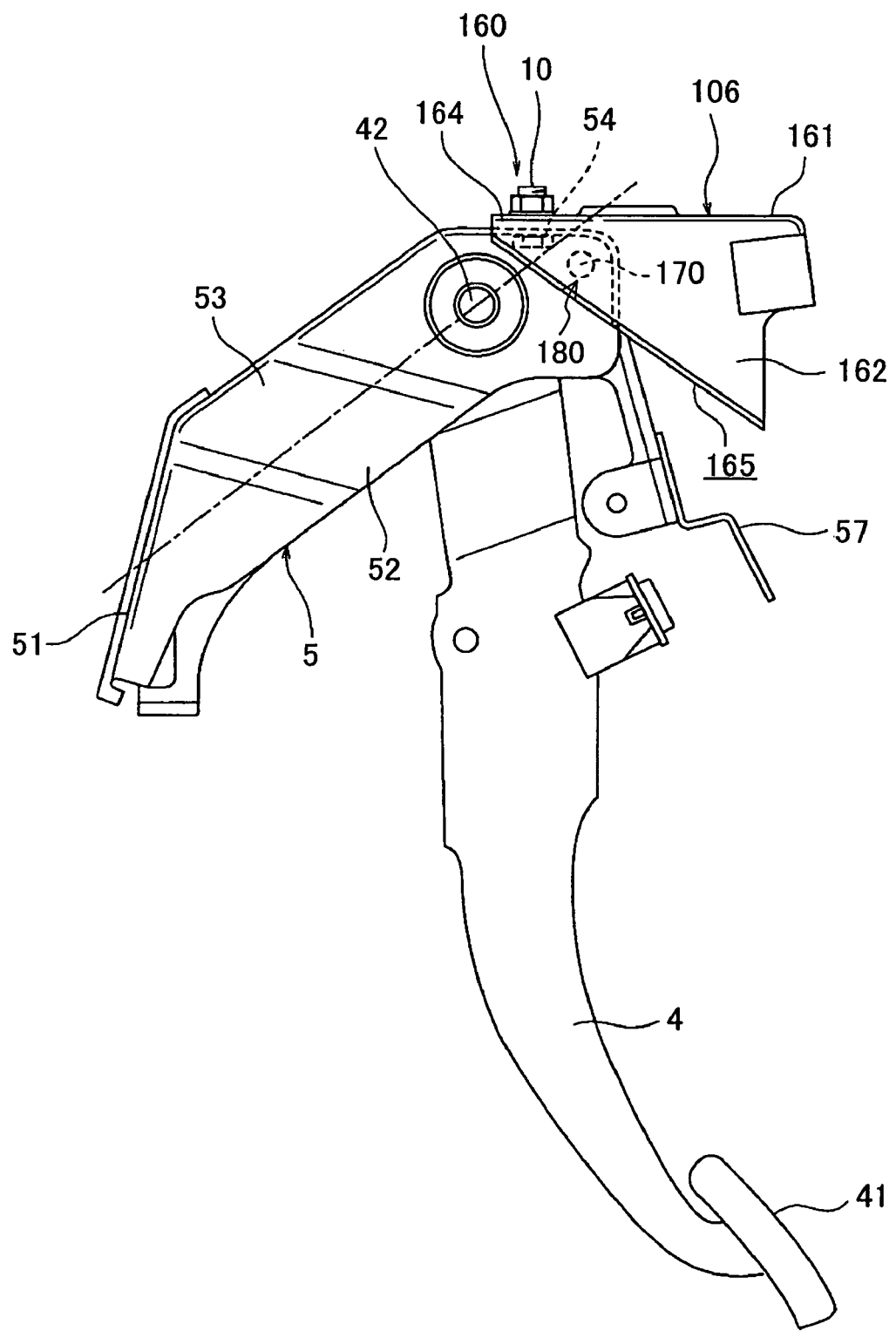
FIG. 15 is an enlarged side view showing a part of the support structure according to a fourth embodiment of the invention at which the brake pedal assembly is supported.
Figure 16:
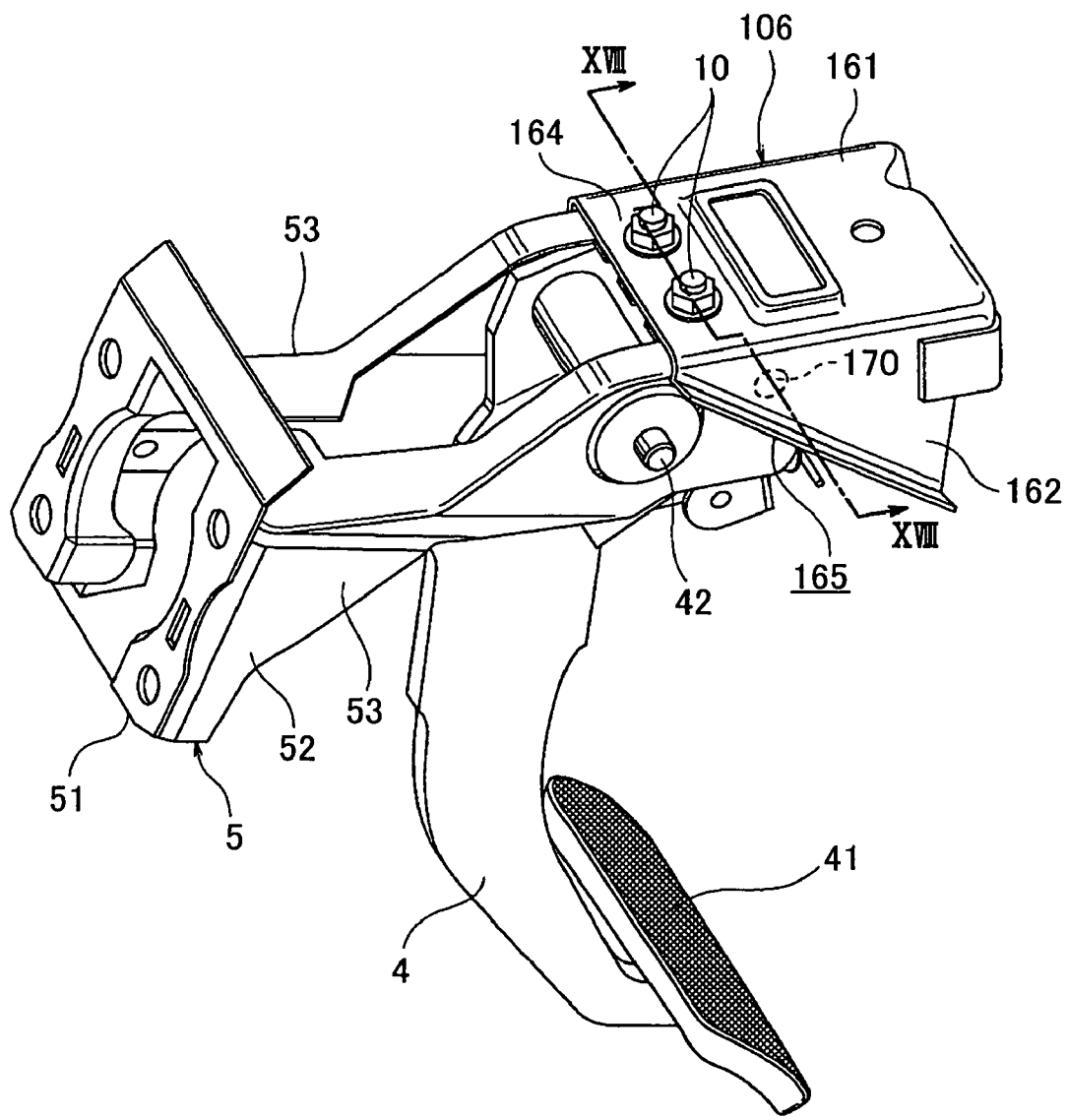
FIG. 16 is an enlarged perspective view showing the part of the support structure according to the fourth embodiment at which the brake pedal assembly is supported.
Figure 17:
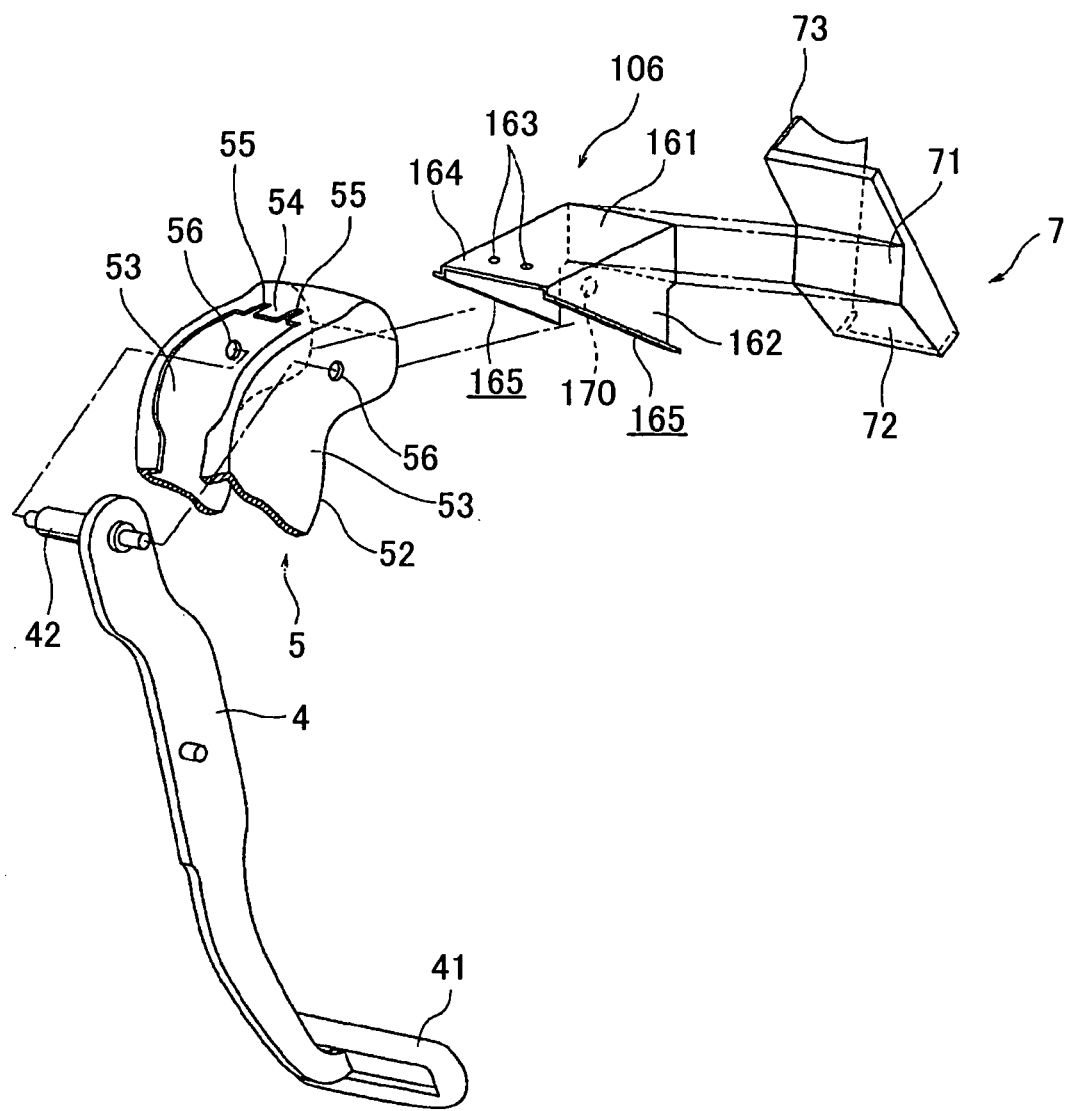
FIG. 17 is an exploded perspective view showing the part of the support structure according to the fourth embodiment at which the brake pedal assembly is supported.
Figure 18:
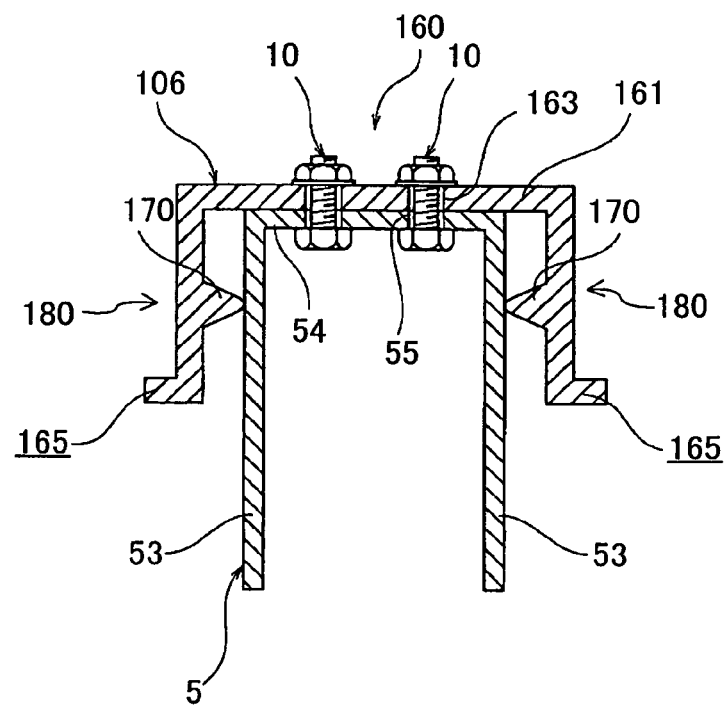
FIG. 18 is a partly cross-sectional view taken along the line XVIII-XVIII in FIG. 17.

As shown in FIGS. 12 to 14, the rear end portions of the sidewalls 53 of the pedal bracket 5 form overlapped parts 80 and 80 together with the corresponding restriction tabs 66 and 66, respectively, of the guide member 6 as seen in the vehicle width direction (from the side). In the overlapped parts 80 and 80, the inside surfaces of the restriction tabs 66 and 66 of the guide member 6 are formed with projections 70 and 70 extending inwardly in the vehicle width direction. The projections 70 and 70 are formed to be off the slidable fixing mechanism 60 (support 64) in the vehicle front-to-rear direction (i.e., formed forward of the slidable fixing mechanism 60 (support 64). Further, the inside end of each projection 70 has a shape that is capable of point contact with the outside surface of the corresponding sidewall 53 of the pedal bracket 5 (see FIG. 14). Portions of the guide member 6 other than the restriction tabs 66 and 66 may be formed with such projections 70. Such projections 70 and 70 may be formed not on the guide member 6 but on the outside surfaces of the sidewalls 53 and 53, respectively, of the pedal bracket 5 to come into point contact with the inside surfaces of the guide member 6.

As described above, in the vehicle pedal assembly support structure of the third embodiment, the sidewalls 53 and 53 of the pedal bracket 5 form overlapped parts 80 and 80 together with the corresponding restriction tabs 66 and 66, respectively, of the guide member 6 and the overlapped parts 80 and 80 have projections 70 and 70 between the sidewalls 53 and 53 and the restriction tabs 66 and 66 of the guide member 6. Therefore, even if the direction of a collision load input from the dash panel 1 to the pedal bracket 5 at the vehicle collision is inclined vertically or laterally to the vehicle front-to-rear direction, for example, because the collision is an offset collision, the relative position of the pedal bracket 5 to the guide member 6 is restricted and thus maintained. This makes it difficult for the pedal bracket 5 to relatively shift in directions other than the vehicle rearward direction to the guide member 6. As a result, even in an offset collision, the pedal bracket 5 can reliably move toward the rear of the vehicle relative to the support 64 of the guide member 6.

Furthermore, since the restriction tabs 66 and 66 of the guide member 6 engage with the pivot shaft 42 for the brake pedal lever 4, the rear end portion of the pedal bracket 5 is less likely to relatively shift in directions other than the rearward direction of the vehicle to the restriction tabs 66 and 66 of the guide member 6. Therefore, the pedal bracket 5 can move toward the rear of the vehicle relative to the support 64 of the guide member 6 with higher reliability.

As a result, the pivot shaft 42 for the brake pedal lever 4 can reliably abut on the guide surfaces 65 and 65 of the guide member 6 to reliably pivot the brake pedal lever 4.

Furthermore, in the vehicle pedal assembly support structure of the third embodiment, the relative position of the pedal bracket 5 to the guide member 6 is restricted by point contact of the projections 70 and 70 with the pedal bracket 5 or the guide member 6 on both sides of the pedal bracket 5. Therefore, the friction resistance of the pedal bracket 5 when moving backward in a vehicle collision can be reduced, which allows a smooth disengagement of the pedal bracket 5 from the guide member 6.

Furthermore, since the projections 70 and 70 are formed at least at positions offset from the slidable fixing mechanism 60 (support 64) in the vehicle front-to-rear direction, a large collision load acting on the pedal bracket 5 can be dispersed by transmitting the load through the pivot shaft 42 for the brake pedal lever 4 to the guide member 6. The collision load acting on the slidable fixing mechanism 60 (support 64) can be reduced accordingly, which prevents undesirable breakage and deformation of the slidable fixing mechanism 60 (support 64). As a result, when the pedal bracket 5 moves backward in a vehicle collision, the pedal bracket 5 can be smoothly disengaged from the guide member 6.

Next, a pedal assembly support structure according to a fourth embodiment of the present invention will be described with reference to FIGS. 15 to 18. The same components as those of the pedal assembly support structure according to the first to third embodiments are indicated by the same reference numerals and the description thereof will be not given.

The fourth embodiment is different from the third embodiment mainly in that a guide member 106 in the fourth embodiment is not provided with restriction tabs and weakened parts and projections 170 and 170 are provided rearward of a slidable fixing mechanism 160. The details will be described below.

As shown in FIGS. 15 to 18, a guide member 106 is placed at the rear of the pedal bracket 5. The guide member 106 has a horizontally extending upper wall 161 of rectangular shape and sidewalls 162 and 162 extending downward from both edges of the upper wall 161 opposed to each other in the vehicle width direction, and has a configuration in which the bottom is open, i.e., a cross-sectional configuration of an inverted U.

A front end portion of the upper wall 161 is formed with two bolt holes 163 and 163, through which the through bolts 10 and 10 are inserted, at a predetermined distance from each other in the vehicle width direction. The front end portion of the upper wall 161 is situated above the connecting part 54 of the pedal bracket 5 formed with the slits 55 and 55 and constitutes a support 164 for supporting the pedal bracket 5. From this regard, the slits 55 and 55 of the pedal bracket 5, the support 164 of the guide member 106 formed with the bolt holes 163 and 163 and the through bolts 10 and 10 constitute a slidable fixing mechanism 160 for fixing the pedal bracket 5 to the guide member 6.

The sidewalls 162 and 162 of the guide member 106 have respective lower edges inclined so that their fronts are higher than their rears, and each have a substantially triangular general shape as seen in the vehicle width direction (from the side). The lower edge of each sidewall 162 of the guide member 106 is bent out in the vehicle width direction over the entire length and the bottom surface of the bent-out part forms a guide surface 165 inclined at a predetermined angle to the horizontal direction.

The rear end portions of the sidewalls 53 of the pedal bracket 5 form overlapped parts 180 and 180 together with the front end portions of the sidewalls 162 and 162, respectively, of the guide member 106 as seen in the vehicle width direction (from the side). In the overlapped parts 180 and 180, the inside surfaces of the sidewalls 162 and 162 of the guide member 106 are formed with projections 170 and 170 extending inwardly in the vehicle width direction. The projections 170 and 170 are formed to be off the slidable fixing mechanism 160 (support 164) in the vehicle front-to-rear direction (i.e., formed rearward of the slidable fixing mechanism 160 (support 164). Further, the inside end of each projection 170 has a shape that is capable of point contact with the outside surface of the corresponding sidewall 53 of the pedal bracket 5 (see FIG. 18). Note that the brake pedal 4 is not shown in FIG. 18. Such projections 170 and 170 may be formed not on the guide member 106 but on the outside surfaces of the sidewalls 53 and 53, respectively, of the pedal bracket 5 to come into point contact with the inside surfaces of the guide member 106.

Next, description will be made of the behavior of the pedal assembly support structure of the fourth embodiment in a vehicle frontal collision.

When a load larger than the predetermined value acts on the dash panel 1 in a vehicle collision, the dash panel 1 significantly moves backward. The pedal bracket 5 fixed to the dash panel 1 also significantly moves backward with the backward movement of the dash panel 1. As a result, the pivot shaft 42 relatively moves backward.

In this case, even if the direction of a collision load input from the dash panel 1 to the pedal bracket 5 at the vehicle collision is inclined vertically or laterally to the vehicle front-to-rear direction, for example, because the collision is an offset collision, the relative position of the pedal bracket 5 to the guide member 106 is restricted and thus maintained. The reason is that the sidewalls 53 and 53 of the pedal bracket 5 form overlapped parts 180 and 180 together with the front end portions, respectively, of the guide member 106 and the overlapped parts 180 and 180 have projections 170 and 170 between the sidewalls 53 and 53 of the pedal bracket 5 and the sidewalls 162 and 162 of the guide member 106. Therefore, it becomes difficult for the pedal bracket 5 to relatively shift in directions other than the vehicle rearward direction to the guide member 106. As a result, even in an offset collision, the pedal bracket 5 can reliably move toward the rear of the vehicle relative to the support 164 of the guide member 106.

With the backward movement of the pedal bracket 5, the through bolts 10 and 10 are dislodged from the slits 55 and 55, respectively, so that the pedal bracket 5 can be dropped out of the guide member 106. In addition, with the backward movement of the pedal bracket 5, the outer peripheries of both ends of the pivot shaft 42 for the brake pedal lever 4 abut on the guide surfaces 165 and 165, respectively, of the guide member 106.

As the pedal bracket 5 further moves backward, both ends of the pivot shaft 42 are guided gradually downward along the guide surfaces 165 and 165 so that the brake pedal lever 4 pivots under a force of constraint of the operating rod 44. Thus, the pedal 41 of the brake pedal lever 4 moves forward.

As can be seen from the above, according to the vehicle pedal assembly support structure of the fourth embodiment, the projections 170 and 170 formed on the guide member 106 restrict the relative position of the rear end portion of the pedal bracket 5 to the support 164 of the guide member 106. This restriction of the relative position provides a reliable backward movement of the pedal bracket 5 and in turn a reliable abutment of the pivot shaft 42 for the brake pedal lever 4 on the guide surfaces 165 and 165 of the guide member 106. As a result, the brake pedal lever 4 can be reliably pivoted.

Next, pedal assembly support structures according to first and second variants of the fourth embodiment will be described with reference to FIGS. 19 and 20, respectively.

Figure 19:
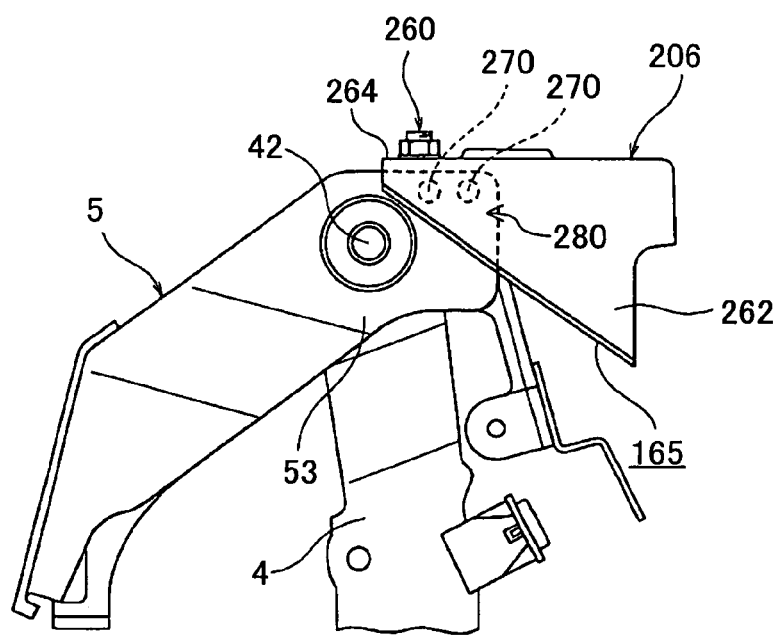
FIG. 19 is an enlarged partly side view showing a part of the support structure according to a first variant of the fourth embodiment at which the brake pedal assembly is supported.

FIG. 19 is a side view showing the first variant of the fourth embodiment. In the first variant, front end portions of the sidewalls 262 and 262 of the guide member 206 form overlapped parts 280 and 280 together with rear end portions of the sidewalls 53 and 53, respectively, of the pedal bracket 5 as seen in the vehicle width direction (from the side). In each of the overlapped parts 280 and 280, the inside surface of the sidewall 262 of the guide member 206 is formed with two projections 270 and 270 aligned in the vehicle front-to-rear direction and extending inwardly in the vehicle width direction. These projections 270 and 270 are formed to be off the slidable fixing mechanism 260 (support 264) in the vehicle front-to-rear direction (i.e., formed rearward of the slidable fixing mechanism 260 (support 264).

In the first variant, each of the sidewalls 262 and 262 of the guide member 206 is formed with two projections 270 and 270 along the vehicle front-to-rear direction, which is advantageous particularly when the direction of a collision load is inclined laterally to the vehicle front-to-rear direction.

Figure 20:
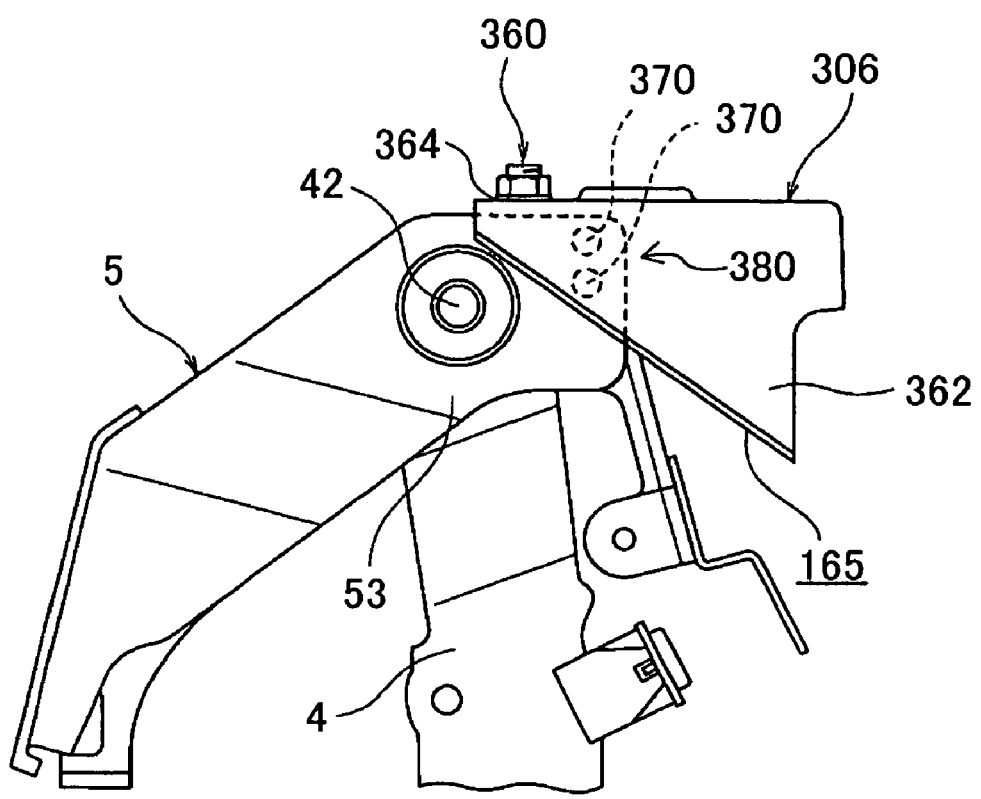
FIG. 20 is an enlarged partly side view showing a part of the support structure according to a second variant of the fourth embodiment at which the brake pedal assembly is supported.

FIG. 20 is a side view showing the second variant of the fourth embodiment. In the second variant, front end portions of the sidewalls 362 and 362 of the guide member 306 form overlapped parts 380 and 380 together with rear end portions of the sidewalls 53 and 53, respectively, of the pedal bracket 5 as seen in the vehicle width direction (from the side). In each of the overlapped parts 380 and 380, the inside surface of the sidewall 362 of the guide member 306 is formed with two projections 370 and 370 aligned in the vertical direction of the car body and extending inwardly in the vehicle width direction. These projections 370 and 370 are formed to be off the slidable fixing mechanism 360 (support 364) in the vehicle front-to-rear direction (i.e., formed rearward of the slidable fixing mechanism 360 (support 364).

In the second variant, each of the sidewalls 362 and 362 of the guide member 306 is formed with two projections 370 and 370 along the vertical direction, which is advantageous particularly when the direction of a collision load is inclined laterally to the vertical direction.

In the fourth embodiment of the present invention, three or more projections may be formed on each sidewall of the guide member. Further, in forming two or more projections on each sidewall of the guide member, the direction of alignment of these projections is not limited to the vertical direction or the vehicle front-to-rear direction but may be selected from any other directions. This is advantageous when a load of offset collision is applied in the selected direction.

The above embodiments show examples in which the pedal assembly support structure of the present invention is applied to the brake pedal assembly. However, the present invention can be also applied to clutch pedal assemblies.

In the above embodiments, the instrument panel reinforcement 81 is used as a vehicle body member to which the guide member 6, 106, 206 or 306 and the car body side mounting member 7 are fixed. However, the vehicle body member for fixing the guide member 6, 106, 206 or 306 and the car body side mounting member 7 in the present invention is not limited to the instrument panel reinforcement 81 but may be any vehicle body member placed in proximity to the pedal lever. Further, the guide part 72 of the car body side mounting member 7 may be dispensed with.

In the above embodiments, the pedal assembly support structure is configured so that the pivot shaft 42 is guided by the guide surfaces 65 or 165. However, the pedal assembly support structure of the present invention may be configured so that the pedal bracket 5 is guided by the guide surfaces 65 or 165.

The pedal assembly support structures of the above embodiments are configured so that the pivot shaft 42 for the brake pedal lever 4 normally does not abut on the guide surfaces 65 or 165, in other words, an allowance is provided for backward movement of the pedal bracket 5. However, the present invention is also applicable to the structure in which the pivot shaft 42 or the pedal bracket 5 normally abuts on the guide surfaces 65 or 165.

The present invention is not limited to the above embodiments but can be implemented in various forms without departing from its spirit and essential characteristics. The above embodiments should therefore be considered in all respects as illustrative only but not restrictive. The scope of the invention is indicated by the claims but not at all restricted to the description. Further, all modifications and changes which come within the range of equivalents of the claims are intended to be embraced within the scope of the invention.

What is claimed is:

1. A vehicle pedal assembly support structure for supporting a pedal assembly which includes a pedal lever placed rearward of a dash panel of a vehicle, a pivot shaft provided at the upper end of the pedal lever to extend in the width direction of the vehicle and a pedal provided at the lower end of the pedal lever, the pedal lever being capable of angular movement about the axis of the pivot shaft, said pedal assembly support structure comprising:

a bracket which is fixed at the front end thereof to the dash panel and extends rearward from the dash panel and to which the pivot shaft for the pedal lever is mounted at a position toward the rear end of the bracket;

a guide member placed at the rear of the bracket and fixed at the rear end thereof to a vehicle body member other than the dash panel;

a fixing mechanism formed across a rear end portion of the bracket and a front end portion of the guide member to normally fix the rear end portion of the bracket to the front end portion of the guide member but disengage the bracket from the guide member in a vehicle collision; and a relative shift restricting member for restraining the rear end portion of the bracket from relatively shifting in directions other than the rearward direction of the vehicle to the front end portion of the guide member, wherein the guide member has a guide surface that downwardly guides the bracket moving backward in the vehicle collision to change the posture of the bracket and thereby relatively move the pedal forward, and the relative shift restricting member comprises a pair of restriction tabs having hooked shapes which circumferentially partly surround the extending ends of the pivot shaft and the rear sides of which are open.

2. A vehicle pedal assembly support structure for supporting a pedal assembly which includes a pedal lever placed rearward of a dash panel of a vehicle, a pivot shaft provided at the upper end of the pedal lever to extend in the width direction of the vehicle and a pedal provided at the lower end of the pedal lever, the pedal lever being capable of angular movement about the axis of the pivot shaft, said pedal assembly support structure comprising:

a bracket which is fixed at the front end thereof to the dash panel and extends rearward from the dash panel and to which the pivot shaft for the pedal lever is mounted at a position toward the rear end of the bracket;

a guide member placed at the rear of the bracket and fixed at the rear end thereof to a vehicle body member other than the dash panel;

a fixing mechanism formed across a rear end portion of the bracket and a front end portion of the guide member to normally fix the rear end portion of the bracket to the front end portion of the guide member but disengage the bracket from the guide member in a vehicle collision; and a relative shift restricting member for restraining the rear end portion of the bracket from relatively shifting in directions other than the rearward direction of the vehicle to the front end portion of the guide member, wherein the guide member has a guide surface that downwardly guides the bracket moving backward in the vehicle collision to change the posture of the bracket and thereby relatively move the pedal forward, and the relative shift restricting member engages, forward of the fixing mechanism, with the pivot shaft for the pedal lever.

3. A vehicle pedal assembly support structure for supporting a pedal assembly which includes a pedal lever placed rearward of a dash panel of a vehicle, a pivot shaft provided at the upper end of the pedal lever to extend in the width direction of the vehicle and a pedal provided at the lower end of the pedal lever, the pedal lever being capable of angular movement about the axis of the pivot shaft, said pedal assembly support structure comprising:
- a bracket which is fixed at the front end thereof to the dash panel and extends rearward from the dash panel and to which the pivot shaft for the pedal lever is mounted at a position toward the rear end of the bracket;
- a guide member placed at the rear of the bracket and fixed at the rear end thereof to a vehicle body member other than the dash panel;
- a fixing mechanism formed across a rear end portion of the bracket and a front end portion of the guide member to normally fix the rear end portion of the bracket to the front end portion of the guide member but disengage the bracket from the guide member in a vehicle collision; and
- a relative shift restricting member for restraining the rear end portion of the bracket from relatively shifting in directions other than the rearward direction of the vehicle to the front end portion of the guide member,
- wherein the guide member has a guide surface that downwardly guides the bracket moving backward in the vehicle collision to change the posture of the bracket and thereby relatively move the pedal forward, and
- the bracket has two sidewalls disposed to interpose the pedal lever therebetween in the width direction of the vehicle,
- both ends of the pivot shaft for the pedal lever extend in the width direction of the vehicle beyond the two sidewalls, respectively, of the bracket,
- the guide member has a pair of restriction tabs having hooked shapes which circumferentially partly surround the extending ends of the pivot shaft from the outsides of both the sidewalls of the bracket and the rear sides of which are open, and
- the relative shift restricting member is provided in overlapping regions of the restriction tabs and the conesponding sidewalls of the bracket.

4. A vehicle pedal assembly support structure for supporting a pedal assembly which includes a pedal lever placed rearward of a dash panel of a vehicle, a pivot shaft provided at the upper end of the pedal lever to extend in the width direction of the vehicle and a pedal provided at the lower end of the pedal lever, the pedal lever being capable of angular movement about the axis of the pivot shaft, said pedal assembly support structure comprising:
- a bracket which is fixed at the front end thereof to the dash panel and extends rearward from the dash panel and to which the pivot shaft for the pedal lever is mounted at a position toward the rear end of the bracket;
- a guide member placed at the rear of the bracket and fixed at the rear end thereof to a vehicle body member other than the dash panel;
- a fixing mechanism formed across a rear end portion of the bracket and a front end portion of the guide member to normally fix the rear end portion of the bracket to the front end portion of the guide member but disengage the bracket from the guide member in a vehicle collision; and
- a relative shift restricting member for restraining the rear end portion of the bracket from relatively shifting in directions other than the rearward direction of the vehicle to the front end portion of the guide member,
- wherein the guide member has a guide surface that downwardly guides the bracket moving backward in the vehicle collision to change the posture of the bracket and thereby relatively move the pedal forward, and
- the guide member has a weakened part provided rearward of the fixing mechanism.

5. The pedal assembly support structure of claim 4, wherein the weakened part is provided between the fixing mechanism and the guide surface.

6. The pedal assembly support structure of claim 4, wherein the weakened part comprises a cutaway extending substantially orthogonally to the guide surface.

7. A vehicle pedal assembly support structure for supporting a pedal assembly which includes a pedal lever placed rearward of a dash panel of a vehicle, a pivot shaft provided at the upper end of the pedal lever to extend in the width direction of the vehicle and a pedal provided at the lower end of the pedal lever, the pedal lever being capable of angular movement about the axis of the pivot shaft, said pedal assembly support structure comprising:
- a bracket which is fixed at the front end thereof to the dash panel and extends rearward from the dash panel and to which the pivot shaft for the pedal lever is mounted at a position toward the rear end of the bracket;
- a guide member placed at the rear of the bracket and fixed at the rear end thereof to a vehicle body member other than the dash panel;
- a fixing mechanism formed across a rear end portion of the bracket and a front end portion of the guide member to normally fix the rear end portion of the bracket to the front end portion of the guide member but disengage the bracket from the guide member in a vehicle collision; and
- a relative shift restricting member for restraining the rear end portion of the bracket from relatively shifting in directions other than the rearward direction of the vehicle to the front end portion of the guide member,
- wherein the guide member has a guide surface that downwardly guides the bracket moving backward in the vehicle collision to change the posture of the bracket and thereby relatively move the pedal forward, and
- the relative shift restricting member comprises a pair of restriction tabs which circumferentially partly surround the extending ends of the pivot shaft and the rear sides of which are open.

8. The pedal assembly support structure of claim 7, wherein
- the fixing mechanism is a slidable mechanism for disengaging the bracket from the guide member after the rear end portion of the bracket moves a predetermined distance backward in a vehicle collision, and
- the guide surface is placed rearward of the fixing mechanism to guide the bracket downward after the bracket moves the predetermined distance backward.

9. The pedal assembly support structure of claim 7, further comprising a relative position restricting member fixed to both the extending ends of the pivot shaft to come into surface contact with the outside surfaces of the restriction tabs and thereby restrict the relative position of the pivot shaft to the guide member.

10. The pedal assembly support structure of claim 9, wherein the relative position restricting member comprises a pair of metal nuts having flat surfaces coming into surface contact with the outside surfaces of the restriction tabs, respectively.

11. The pedal assembly support structure of claim 10, wherein the flat surfaces of the nuts come into surface contact with the outside surfaces of the restriction tabs through low-friction members, respectively, having a lower coefficient of friction than metal.

12. The pedal assembly support structure of claim 10, wherein the flat surface of each of the nuts has a circular shape.

13. A vehicle pedal assembly support structure for supporting a pedal assembly which includes a pedal lever placed rearward of a dash panel of a vehicle, a pivot shaft provided at the upper end of the pedal lever to extend in the width direction of the vehicle and a pedal provided at the lower end of the pedal lever, the pedal lever being capable of angular movement about the axis of the pivot shaft, said pedal assembly support structure comprising:
- a bracket which is fixed at the front end thereof to the dash panel and extends rearward from the dash panel and to which the pivot shaft for the pedal lever is mounted at a position toward the rear end of the bracket;
- a guide member placed at the rear of the bracket and fixed at the rear end thereof to a vehicle body member other than the dash panel;
- a fixing mechanism formed across a rear end portion of the bracket and a front end portion of the guide member to normally fix the rear end portion of the bracket to the front end portion of the guide member but disengage the bracket from the guide member in a vehicle collision; and
- a relative shift restricting member for restraining the rear end portion of the bracket from relatively shifting in directions other than the rearward direction of the vehicle to the front end portion of the guide member, wherein the guide member has a guide surface that downwardly guides the bracket moving backward in the vehicle collision to change the posture of the bracket and thereby relatively move the pedal forward, and
the bracket has two sidewalls disposed to interpose the pedal lever therebetween in the width direction of the vehicle,
both ends of the pivot shaft for the pedal lever extend in the width direction of the vehicle beyond the two sidewalls, respectively, of the bracket,
the guide member has a pair of restriction tabs which circumferentially partly surround the extending ends of the pivot shaft from the outsides of both the sidewalls of the bracket and the rear sides of which are open, and
the relative shift restricting member is provided in overlapping regions of the restriction tabs and the corresponding sidewalls of the bracket.

14. The pedal assembly support structure of claim 13, wherein the relative shift restricting member is provided to be off the fixing mechanism in the front-to-rear direction of the vehicle.

15. The pedal assembly support structure of claim 13, wherein the relative shift restricting member comprises projections formed at both sides of the bracket in the width direction of the vehicle to project from at least one of the bracket or the guide member and come into point contact with the bracket or the guide member.

16. The pedal assembly support structure of claim 13, wherein the relative shift restricting member comprises projections formed at both sides of the bracket in the width direction of the vehicle to project from at least one of the bracket or the guide member and come into point contact with the bracket or the guide member, two or more said projections being formed along a certain direction at each of both sides of the bracket.

* * * * *